(12) United States Patent
Kumakura et al.

(10) Patent No.: US 10,431,823 B2
(45) Date of Patent: Oct. 1, 2019

(54) METHOD FOR MANUFACTURING BASE MATERIAL POWDER HAVING CARBON NANO-COATING LAYER, METHOD FOR MANUFACTURING MGB2 SUPERCONDUCTOR USING THE METHOD, MGB2 SUPERCONDUCTOR, METHOD FOR MANUFACTURING POSITIVE ELECTRODE MATERIAL FOR LITHIUM ION BATTERY, LITHIUM ION BATTERY, AND METHOD FOR MANUFACTURING PHOTOCATALYST

(71) Applicant: NATIONAL INSTITUTE FOR MATERIALS SCIENCE, Ibaraki (JP)

(72) Inventors: Hiroaki Kumakura, Ibaraki (JP); Shujun Ye, Ibaraki (JP); Akira Hasegawa, Ibaraki (JP); Yoshimi Kubo, Ibaraki (JP); Eiki Yasukawa, Ibaraki (JP); Akihiro Nomura, Ibaraki (JP)

(73) Assignee: NATIONAL INSTITUTE FOR MATERIALS SCIENCE, Ibaraki (JP)

( * ) Notice: Subject to any disclaimer, the term of this patent is extended or adjusted under 35 U.S.C. 154(b) by 0 days.

(21) Appl. No.: 15/310,161

(22) PCT Filed: Jul. 30, 2015

(86) PCT No.: PCT/JP2015/071688
§ 371 (c)(1),
(2) Date: Nov. 10, 2016

(87) PCT Pub. No.: WO2016/021483
PCT Pub. Date: Feb. 11, 2016

(65) Prior Publication Data
US 2017/0263932 A1    Sep. 14, 2017

(30) Foreign Application Priority Data

Aug. 4, 2014   (JP) ................................ 2014-158308
Oct. 28, 2014  (JP) ................................ 2014-218800
Feb. 24, 2015  (JP) ................................ 2015-033651

(51) Int. Cl.
*H01M 4/58*     (2010.01)
*B01J 23/50*    (2006.01)
(Continued)

(52) U.S. Cl.
CPC .......... *H01M 4/5825* (2013.01); *B01J 21/18* (2013.01); *B01J 23/50* (2013.01); *B01J 35/004* (2013.01);
(Continued)

(58) Field of Classification Search
None
See application file for complete search history.

(56) References Cited

U.S. PATENT DOCUMENTS 7,344,659 B2    3/2008  Ravet et al.
2007/0054810 A1 3/2007  Kumakura et al.
(Continued)

FOREIGN PATENT DOCUMENTS

JP    2011-76931    4/2011

OTHER PUBLICATIONS

International Search Report dated Oct. 27, 2015 in International Application No. PCT/JP2015/071688.
(Continued)

*Primary Examiner* — Wyatt P McConnell
(74) *Attorney, Agent, or Firm* — Wenderoth, Lind & Ponack, L.L.P.

(57) ABSTRACT

Provided is a method for manufacturing a base material powder having a carbon nanocoating layer, the method
(Continued)

(a) Coronene (or superbenzene)

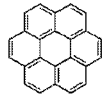

(b) Anthanthrene 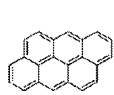

(c) Benzo(*ghi*)perylene 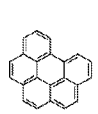

(g) Diindenoperylene 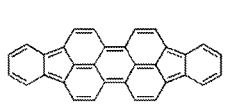

(h) Helicene 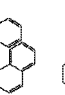

(i) Heptacene 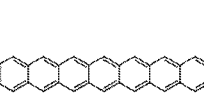

(d) Circulene 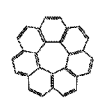

(e) Corannulene 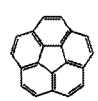

(f) Dicoronylene 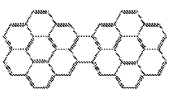

(j) Hexacene (k) kekulene (l) Ovalene including adding a polycyclic aromatic hydrocarbon to a base material powder, heating the mixture to a temperature that is higher than or equal to the boiling point of the polycyclic aromatic hydrocarbon and is lower than or equal to the relevant boiling point temperature+300° C., and that is higher than or equal to the thermal decomposition temperature of the polycyclic aromatic hydrocarbon, and thereby coating the surface of the base material powder with a layer of carbon having a thickness of 0.1 nm to 10 nm. According to the method, when a source of carbon that covers a base material powder is appropriately selected, the base material powder having the carbon nanocoating layer can be provided, which does not have a possibility of causing inconveniences in the applications of a final manufactured product of the base material powder and exhibits satisfactory productivity of the base material powder, and from which a modified final manufactured product is obtained.

4 Claims, 19 Drawing Sheets

(51) Int. Cl.

| | |
|---|---|
| *C01B 35/04* | (2006.01) |
| *H01B 12/04* | (2006.01) |
| *H01B 13/00* | (2006.01) |
| *H01M 4/48* | (2010.01) |
| *B01J 35/00* | (2006.01) |
| *B01J 35/02* | (2006.01) |
| *H01M 4/36* | (2006.01) |
| *H01M 4/485* | (2010.01) |
| *H01M 4/62* | (2006.01) |
| *H01M 10/0525* | (2010.01) |
| *B01J 37/08* | (2006.01) |
| *B01J 21/18* | (2006.01) |
| *H01M 4/131* | (2010.01) |
| *H01M 4/136* | (2010.01) |
| *H01M 4/1391* | (2010.01) |
| *H01M 4/1397* | (2010.01) |
| *H01M 10/052* | (2010.01) |
| *C01B 32/05* | (2017.01) |
| *H01M 4/02* | (2006.01) |

(52) U.S. Cl.
CPC ........... *B01J 35/023* (2013.01); *B01J 37/084* (2013.01); *C01B 32/05* (2017.08); *C01B 35/04* (2013.01); *H01B 12/04* (2013.01); *H01B 13/00* (2013.01); *H01M 4/131* (2013.01); *H01M 4/136* (2013.01); *H01M 4/1391* (2013.01); *H01M 4/1397* (2013.01); *H01M 4/366* (2013.01); *H01M 4/48* (2013.01); *H01M 4/485* (2013.01); *H01M 4/58* (2013.01); *H01M 4/625* (2013.01); *H01M 10/052* (2013.01); *H01M 10/0525* (2013.01); *H01M 2004/028* (2013.01)

(56) References Cited

U.S. PATENT DOCUMENTS

| | | | |
|---|---|---|---|
| 2008/0274902 A1 | 11/2008 | Yamada et al. | |
| 2009/0005251 A1* | 1/2009 | Fluekiger | H01L 39/141 505/231 |
| 2009/0156410 A1 | 6/2009 | Nakane et al. | |
| 2012/0088151 A1 | 4/2012 | Yamazaki et al. | |
| 2015/0295292 A1* | 10/2015 | Zhao | H01M 12/08 429/405 |

OTHER PUBLICATIONS

A.V. Talyzin et al., "Coronene Fusion by heat treatment: Road to Nanographenes", J. Physical Chemistry C 2011, 115, pp. 13207-13214.

Shu Jun Ye et al., "Strong enhancement of high-field critical current properties and irreversibility field of $MgB_2$ superconducting wires by coronene active carbon source addition via new B powder carbon-coating method", Supercond. Sci. Technol. 27 (2014) 085012 (10pp).

S.J. Ye et al., "Enhancement of the critical current density of internal Mg diffusion processed $MgB_2$ wires by the addition of both SiC and liquid aromatic hydrocarbon", Physica C 471(2011) pp. 1133-1136.

Jesús Martinez-Blanco et al., "Long-Range Order in an Organic Overlayer Induced by Surface Reconstruction: Coronene on Ge(111)", J. Phys. Chem. C 2014, 118, pp. 11699-11703.

A.C. Ferrari et al., "Interpretation of Raman spectra of disordered and amorphous carbon", Phys. Rev. B 61 (2000), pp. 14095-14017.

Yoshinobu Yasunaga et al., "New method for supporting carbon on $LiFePO_4$ positive electrode active material for lithium ion battery", GS Yuasa Technical Report, Jun. 2008, vol. 5, No. 1, with English abstract.

Kinson Kam et al., "Electrode Materials for Lithium Ion Batteries", Material Matters, vol. 7, No. 4, p. 4 to p. 10 (Dec. 2012); http://www.sigmaaldrich.com/content/dam/sigma-aldrich/docs/SAJ/Brochure/1/mm7-4_j.pdf.

Ye Shu Jun et al., "Strong enhancement of high-field critical current properties and irreversibility field of $MgB_2$ superconducting wires by coronene active carbon source addition via the new B powder carbon-coating method", Superconductor Science and Technology, Jul. 4, 2014, vol. 27, No. 8, p. 085012, 1-10, ISSN 0953-2048.

Notification of Reasons for Refusal dated Jun. 20, 2017 in corresponding Japanese Patent Application No. 2016-540185, with Machine translation.

Notification of Reasons for Refusal dated Nov. 21, 2017 in corresponding Japanese Patent Application No. 2016-540185, with Machine translation.

Extended European Search Report dated Feb. 15, 2018 in corresponding European Patent Application No. 15829986.7.

Hiroki Matsui et al., "Open-circuit voltage study in $LiFePO_4$ olivine cathode", Journal of Power Sources, 2010, vol. 195, No. 19, p. 6879-6883.

European Patent Office Official Letter dated Sep. 18, 2018 in corresponding European Patent Application No. 15829986.7.

European Patent Office Communication dated Jan. 25, 2019 in corresponding European Patent Application No. 15829986.7.

* cited by examiner

Fig. 1A
(a) Coronene (or superbenzene)
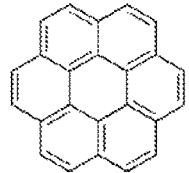
(b) Anthanthrene
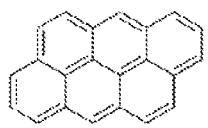
(c) Benzo(*ghi*)perylene
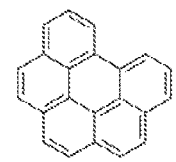
(d) Circulene
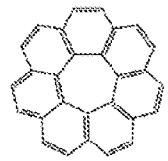
(e) Corannulene
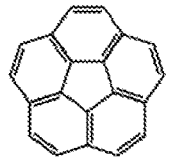
(f) Dicoronylene
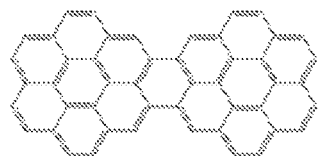
Fig. 1B
(g) Diindenoperylene
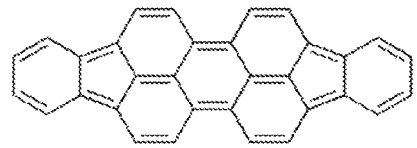
(h) Helicene
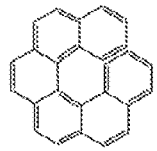
(i) Heptacene
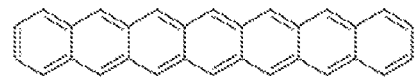
(k) kekulene
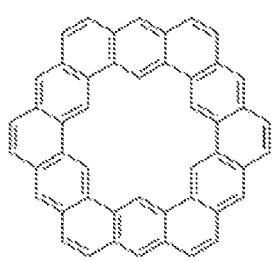
(j) Hexacene
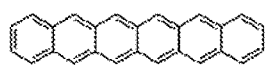
(l) Ovalene
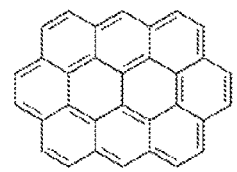

Fig. 1C
(m) Zethrene
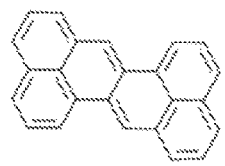
(n) Benzopyrene
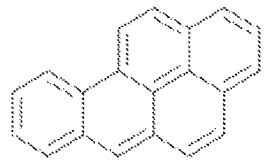
(o) Benzo(a)pyrene
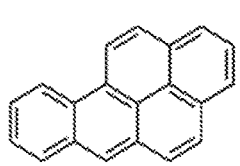
(p) Benzo(e)pyrene
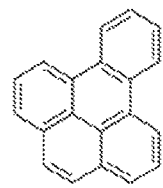
(q) Benzo(a)fluoranthene
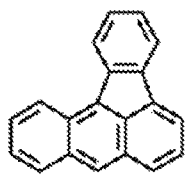
(r) Benzo(b)fluoranthene
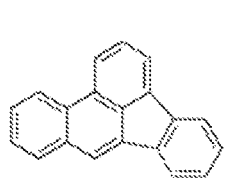
Fig. 1D
(s) Benzo(j)fluoranthene
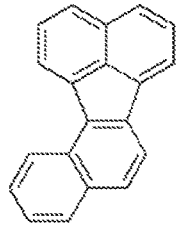
(t) Benzo(k)fluoranthene
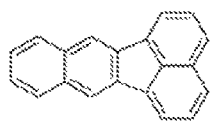
(u) Dibenz(a,h)anthracene
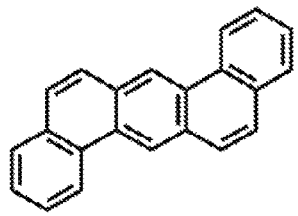
(v) Dibenz(a,j)anthracene
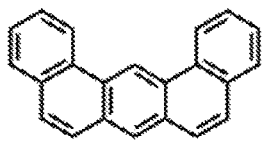
(w) Olympicene
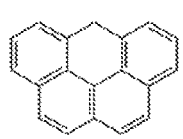
(x) Pentacene
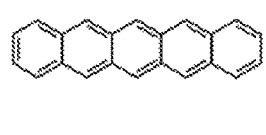

Fig. 1E
(y) Perylene
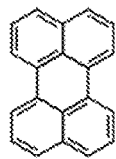
(z) Picene
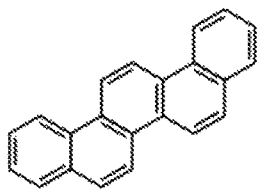
(aa) Tetraphenylene
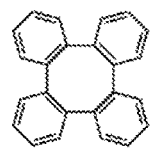
(ab) Benz(a)anthracene
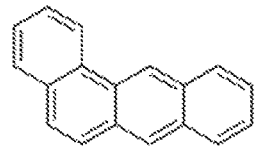
(ac) Benzo(a)fluorene
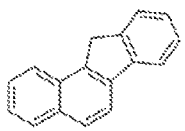
(ad) Benzo(c)phenanthrene
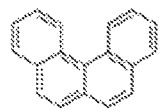
Fig. 1F
(ae) Chrysene
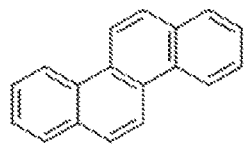
(af) Fluoranthene
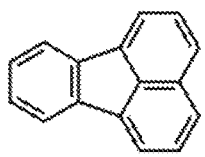
(ag) Pyrene
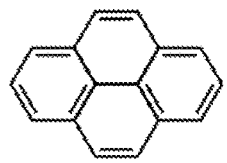
(ah) Tetracene
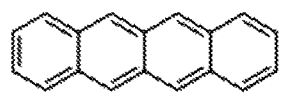
(ai) Triphenylene
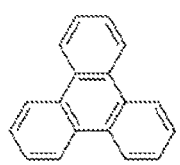
(aj) Anthracene
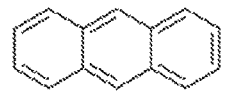
(ak) Fluorene
(al) Phenalene
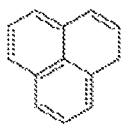
(am) Phenanthrene
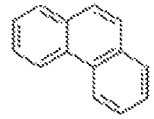

Fig. 19

| | ITEM | UNIT | LFP/SGBH8 | C-LFP/SGBH8 | DESIGN SPEC |
|---|---|---|---|---|---|
| POSITIVE ELECTRODE | DESIGN CAPACITY | mAh | 4.7 | 4.7 | 4.0 |
| Al FOIL | THICKNESS | μm | 20 | 20 | 20 |
| ELECTRODE PLATE | POSITIVE ELECTRODE THICKNESS | μm | 123 | 116 | 98 |
| | COATING WIDTH | mm | 16φ | 16φ | 16φ |
| | COATING AREA | cm² | 2.0 | 2.0 | 2.0 |
| | MIXTURE DENSITY | g/cm³ | 1.8 | 1.8 | 2.0 |
| | MIXTURE SURFACE DENSITY | mg/cm² | 18.3 | 18.1 | 15.6 |
| | ACTIVE MATERIAL RATIO | wt% | 86 | 86 | 86 |
| | SPECIFIC CAPACITY | mAh/g | 1st CHARGE 160/ DISCHARGE 150 | 1st CHARGE 160/ DISCHARGE 150 | 1st CHARGE 160/ DISCHARGE 150 |
| NEGATIVE ELECTRODE | THICKNESS | μm | 18 | 18 | 18 |
| Cu FOIL | | | | | |
| ELECTRODE PLATE | NEGATIVE ELECTRODE THICKNESS | μm | 70 | 70 | 64.7 |
| | COATING WIDTH | mm | 16φ | 16φ | 16φ |
| | COATING AREA | cm² | 2.0 | 2.0 | 2.0 |
| | MIXTURE DENSITY | g/cm³ | 1.5 | 1.5 | 1.5 |
| | MIXTURE SURFACE DENSITY | mg/cm² | 7.6 | 7.7 | 7.0 |
| | ACTIVE MATERIAL RATIO | wt% | 97.5 | 97.5 | 97.5 |
| | USE CAPACITY | mAh/g | 1st CHARGE 389/ DISCHARGE 350 | 1st CHARGE 389/ DISCHARGE 350 | 1st CHARGE 389/ DISCHARGE 350 |
| SEPARATOR | CG2320 | μm | 20 | 20 | 20 |
| 3 LAYERS | WIDTH × LENGTH | mm | 18φ | 18φ | 18φ |
| CAPACITY RATIO | NEGA ELECTRODE/ POSI ELECTRODE | | 1.1 | 1.2 | 1.2 |

■ LIQUID ELECTROLYTE: 1mol/dm3 LiPF6 / EC + DEC (3:7)

Fig. 20

|  | POSITIVE ELECTRODE WEIGHT mg | NEGATIVE ELECTRODE WEIGHT mg | POSITIVE ELECTRODE BASIS WEIGHT mg/cm² | NEGATIVE ELECTRODE BASIS WEIGHT mg/cm² | A/C RATIO | DESIGN CAPACITY mAh |
|---|---|---|---|---|---|---|
| LFP-01 | 47.85 | 47.69 | 18.401 | 7.627 | 1.14 | 4.77 |
| LFP-02 | 47.59 | 47.59 | 18.267 | 7.578 | 1.14 | 4.74 |
|  |  |  | 18.334 | 7.603 | 1.14 | 4.76 |
| CLFP-01 | 47.42 | 47.85 | 18.183 | 7.707 | 1.17 | 4.72 |
| CLFP-02 | 47.08 | 47.80 | 18.017 | 7.682 | 1.18 | 4.67 |
|  |  |  | 18.100 | 7.695 | 1.17 | 4.69 |

Fig. 21

| CELL ID | DESIGN CAPACITY mAh | POSITIVE ELECTRODE SURFACE CAPACITY mg/cm² | DISCHARGE CAPACITY mAh(0.2C) | SPECFIC CAPACITY (mAh/g) | RATIO TO DESIGN VALUE mAh% |
|---|---|---|---|---|---|
| LFP-01 | 4.77 | 18.4 | 1.49 | 46.7 | 31.1 |
| LFP-02 | 4.74 | 18.26 | 1.56 | 49.4 | 33 |
| C-LFP-01 | 4.72 | 18.18 | 3.01 | 95.7 | 63.8 |
| C-LFP-02 | 4.67 | 18.02 | 3.01 | 96.7 | 64.5 |

※DESIGN SPECIFIC CAPACITY 150mAh/g

METHOD FOR MANUFACTURING BASE MATERIAL POWDER HAVING CARBON NANO-COATING LAYER, METHOD FOR MANUFACTURING MGB2 SUPERCONDUCTOR USING THE METHOD, MGB2 SUPERCONDUCTOR, METHOD FOR MANUFACTURING POSITIVE ELECTRODE MATERIAL FOR LITHIUM ION BATTERY, LITHIUM ION BATTERY, AND METHOD FOR MANUFACTURING PHOTOCATALYST

TECHNICAL FIELD

The present invention relates to a method for manufacturing a base material powder having a carbon nanocoating layer, and more particularly, the invention relates to a method for manufacturing a base material powder in which the surface of the base material powder is covered with a carbon nanocoating layer in an amorphous state derived from pyrolytic carbon having a uniform thickness of about several nanometers (nm).

Furthermore, the present invention relates to a method for manufacturing $MgB_2$ superconductor using the method for manufacturing a base material powder having a carbon nanocoating layer described above, and to $MgB_2$ superconductor.

Furthermore, the present invention relates to a method for manufacturing a positive electrode material for a lithium ion battery using the method for manufacturing a base material powder having a carbon nanocoating layer described above.

Furthermore, the present invention relates to a lithium ion battery using a positive electrode material having a carbon-based material as a conductive agent, and more particularly, the invention relates to the improvement of a lithium ion battery using lithium iron phosphate ($LiFePO_4$) or the like as a positive electrode material.

Furthermore, the present invention relates to a method for manufacturing a photocatalyst using the method for manufacturing the base material powder having a carbon nanocoating layer described above.

BACKGROUND ART

It may be effective to coat the surface of a base material powder with a carbon film having a uniform thickness of about several nanometers (nm) for performing modification of the base material powder, and such a base material powder is used, for example, in an intermediate production process or as an intermediate raw material for the production of $MgB_2$ superconductor, a positive electrode material for a lithium ion battery, a photocatalyst or the like. In this case, various substances have been known as the sources of carbon that coats the base material powder; however, upon the addition of an aromatic hydrocarbon, the aromatic hydrocarbon is decomposed at the time of heat treatment, and hydrogen is generated. There is a possibility that this hydrogen may cause failure in the applications of final manufactured products of the base material powder. Furthermore, a method of coating the surface of base material powder particles with carbon by a gas phase method has also been suggested; however, since the control of the carbon coating layer is difficult, and since a gas phase method is used, there is a problem that production of base material powders in large quantities is difficult (highly expensive).

Next, in regard to $MgB_2$ superconductor, which is one of the applications of the base material powder having a carbon nanocoating layer, $MgB_2$ superconductor has a critical temperature Tc that is higher compared to practical superconducting materials, and also has advantages such as follows for practical use.

i) On the occasion of passing a large superconducting current from one crystal grain to a neighboring crystal grain, it is considered unnecessary to align the directions of crystal grains (orientation) such as in the case of high temperature oxide superconductors;

ii) $MgB_2$ superconductor is abundant in resources, and the raw materials are relatively inexpensive;

iii) $MgB_2$ superconductor is mechanically tough; and iv) $MgB_2$ superconductor is lightweight.

Therefore, $MgB_2$ superconductor is considered to be promising as a practical useful material, and research and development thereof is currently underway.

On the other hand, $MgB_2$ superconductor has a problem that the upper critical magnetic field $H_{C2}$ is low. In this regard, it has been reported that when some of B sites are substituted by carbon (C), the $H_{C2}$ is increased to a large extent. The most common method for substituting B sites with C is a method of adding SiC powder to a mixed raw material powder of Mg and B, and heat-treating the mixture. Furthermore, a method of adding an aromatic hydrocarbon to raw material powders of Mg and B is also effective, and enhancement of the Jc characteristics in a high magnetic field are achieved by substituting some B sites in $MgB_2$ crystals with C through the addition of an aromatic hydrocarbon (see Patent Literatures 1 to 3).

However, in the addition of an aromatic hydrocarbon, the aromatic hydrocarbon is decomposed at the time of heat treatment, and hydrogen is generated. There is a possibility that this hydrogen generation may cause defects during the production of a long superconducting wire. On the other hand, a method of coating the surface of B powder particles with C by a gas phase method has also been reported. That is, if methane gas is introduced when B nanopowder is produced by a rf plasma method using $BCl_3$ as a raw material, carbon-coated B nanopowder is obtained. However, this method has a problem that Cl remains as an impurity, control of the carbon coating layer is difficult, and production of B powder in large quantities is difficult (very expensive) because the method is a gas phase method.

Furthermore, since lithium ion secondary batteries have high voltages and high energy densities, lithium ion secondary batteries are widely used for portable electronic equipment such as mobile phones and laptop computers, and power supplies to be mounted in vehicles. Regarding the positive electrode of a lithium ion secondary battery, various substances such as lithium cobaltate and lithium manganate are available; however, among these, $LiFePO_4$ is a material to which attention is paid as a positive electrode material for large-sized batteries for the following reasons.

(i) The substance does not include a rare metal;

(ii) the substance is harmless and is highly safe; and (iii) the substance has satisfactory cycle characteristics.

However, electrical conductivity is lower by about a number of the order of 1,000 to a number of the order of 100,000 compared to other positive electrode materials, and in order to increase the electrical conductivity, $LiFePO_4$ nanopowder particles are used, and the nanopowder particles have a carbon nanocoating in which acetylene black or the like is used, on the surface.

Therefore, one of the most important technologies for the commercialization of $LiFePO_4$ is the deposition of a conductive agent such as a carbon nanocoating on the surface of $LiFePO_4$ particles (see, for example, Non Patent Literature 4). Examples of the method of producing a carbon coating on LiFePO$_4$ include a method of adding a polyvinyl chloride powder in a solid phase method, and a method of using methanol (see, for example, Patent Literatures 4 and 5, and Non Patent Literature 7). However, these prior art technologies need to use a solvent or to use a kiln having a rotating function, and there is a problem that all of these technologies are not simple in terms of process, and cannot be said to be operable at low cost.

On the other hand, it may be effective to cover the surface of an electrode active material with a carbon film having a uniform thickness of about several nanometers (nm), for performing modification of the base material powder that constitutes an electrode active material, and for the production of a positive electrode material for a lithium ion battery or the like, the base material powder is used in an intermediate production process or as an intermediate raw material. In this case, various substances have been known as the sources of carbon that coats the base material powder; however, upon the addition of an aromatic hydrocarbon, the aromatic hydrocarbon is decomposed at the time of heat treatment, and hydrogen is generated. There is a possibility that this hydrogen may cause failure in the applications of final manufactured products of the base material powder. Furthermore, a method of coating the surface of base material powder particles with carbon by a gas phase method has also been suggested; however, since the control of the carbon coating layer is difficult, and since a gas phase method is used, there is a problem that production of base material powders in large quantities is difficult (highly expensive).

CITATION LIST

Patent Literature

Patent Literature 1: WO 2007/049623 A
Patent Literature 2: JP 2007-59261 A
Patent Literature 3: JP 2008-235263 A
Patent Literature 4: JP 2011-76931 A
Patent Literature 5: JP 2012-99468 A Non Patent Literature Non Patent Literature 1: Coronene Fusion by heat treatment: Road to Nanographenes, A. V. Talyzin, et al., J. Physical Chemistry Non Patent Literature 2: Strong enhancement of high-field critical current properties and irreversibility field of MgB$_2$ superconducting wires by coronene active carbon source addition via new B powder carbon-coating method: Ye shujun, et al., Supercond. Sci. & Technol.

Non Patent Literature 3: S. J. Ye, et al., Enhancement of the critical current density of internal Mg diffusion processed MgB$_2$ wires by the addition of both SiC and liquid aromatic hydrocarbon, Physica C471 (2011) 1133

Non Patent Literature 4: J. M. Blanco, et al., Long-Range order in an organic over Layer induced by surface reconstruction: coronene on Ge(111), J. Phys. Chem. C118 (2014) 11699

Non Patent Literature 5: Interpretation of Raman spectra of disordered and amorphous carbon, A. C. Ferrari, et al., Phys. Rev. B 61 (2000) 14095.

Non Patent Literature 6: New method for supporting carbon on LiFePO$_4$ positive electrode active material for lithium ion battery, Yasunaga, Yoshinobu, et al., G S Yuasa Technical Report, June 2008, Vol. 5, No. 1

Non Patent Literature 7: Material Matters, Vol. 7, No. 4, page 4 to page 10 (December 2012); http://www.sigmaaldrich.com/content/dam/sigma-aldrich/docs/SAJ/Brochure/1/mm7-4_j.pdf

SUMMARY OF INVENTION

Technical Problem

The present invention has solved the problems described above, and it is an object of the present invention to provide a method for manufacturing a base material powder having a carbon nanocoating layer, in which when the source of carbon that coats a base material powder is appropriately selected, there is no possibility of causing failure in the applications of final manufactured products of the base material powder, and modified final manufactured products of the base material powder is obtained with satisfactory productivity.

Furthermore, it is another object of the present invention to provide a method for manufacturing a MgB$_2$ superconducting wire having high critical current density (Jc) characteristics and less fluctuation in the critical current density (Jc), by which addition of a polycyclic aromatic hydrocarbon (nanographene) to a MgB$_2$ superconducting wire with excellent uniformity can be realized by using the method for manufacturing a base material powder having a carbon nanocoating, and to provide MgB$_2$ superconductor.

Furthermore, it is another object of the invention to provide a method for manufacturing a novel positive electrode material for a lithium ion battery by using the method for manufacturing a base material powder having a carbon nanocoating layer, which has been exclusively developed by the inventors of the present invention.

Furthermore, it is another object of the present invention to provide a lithium ion battery having excellent discharge characteristics compared to conventional lithium ion batteries, by using the method for manufacturing a positive electrode material for a lithium ion battery described above.

Furthermore, it is another object of the present invention to provide a novel method for manufacturing a photocatalyst by using the method for manufacturing the base material powder having the carbon nanocoating layer.

Solution to Problem

The present invention is to provide a new production method of coating a base material powder such as B powder with carbon. That is, the inventors of the present invention have devised the present invention based on the clue that carbon coating of B powder has been realized by using coronene (C$_{24}$H$_{12}$), which is one kind of polycyclic aromatic hydrocarbons (nanographenes), mixing solid coronene and B powder, vacuum sealing the mixture, and heat-treating the mixture at or above 600° C., which is higher than or equal to the boiling point temperature of coronene and is higher than or equal to the thermal decomposition temperature of coronene. That is, coronene is evaporated by this heat treatment; however, coronene molecules undergo condensation while liberating hydrogen, and this leads to the formation of oligomers, which are deposited on the surface of the B powder. Thus, coating with oligomers occurs. In a case in which the heat treatment temperature is high, since it may be considered that hydrogen atoms are all extracted and the coating is converted to carbon, a carbon coating layer on the surface of the base material powder is obtained.

A method for manufacturing a base material powder having a carbon nanocoating layer of the present invention includes adding a polycyclic aromatic hydrocarbon to a base material powder; heating the mixture at a temperature that is higher than or equal to the boiling point of the polycyclic aromatic hydrocarbon and is lower than or equal to the relevant boiling point temperature+300° C., and that is higher than or equal to the thermal decomposition temperature of the polycyclic aromatic hydrocarbon; and thereby coating the surface of the base material powder with from 1 layer to 300 layers of carbon atoms. At this temperature higher than or equal to (boiling point+300° C.), the vapor pressure of the relevant polycyclic aromatic hydrocarbon becomes too high, and heating of a large amount of a mixture of the base material powder and the polycyclic aromatic hydrocarbon is technically difficult.

A method for manufacturing a base material powder having a carbon nanocoating layer of the present invention includes adding a polycyclic aromatic hydrocarbon to a base material powder; heating the mixture at a temperature that is higher than or equal to the boiling point of the polycyclic aromatic hydrocarbon and is lower than or equal to the relevant boiling point temperature+300° C., and that is higher than or equal to the thermal decomposition temperature of the polycyclic aromatic hydrocarbon; and thereby coating the surface of the base material powder with a layer of carbon having a thickness of from 0.1 nm to 10 nm. When the nanocoating layer has the thickness described above, a sufficient amount of carbon and a compact carbon layer are obtained.

In regard to the method for manufacturing a base material powder having a carbon nanocoating layer of the present invention, preferably, the base material powder may be a base material powder for a lithium ion battery positive electrode material selected from the group consisting of $SnO_2$ powder, $LiVPO_4$ powder, $LiFePO_4$ powder, $LiNi_{0.5}Mn_{1.5}O_4$ powder, $LiMnPO_4$ powder, $Li_2FeSiO_4$ powder, $V_2O_5$ powder, $MnO_2$ powder, $LiCoO_2$ powder, $LiNiO_2$ powder, $LiNi_{0.5}Mn_{0.5}O_2$ powder, $LiMn_2O_4$ powder, $Li_2S$ powder, and $SiO_2$ powder; a base material powder formed from a laminate of Ag powder and $TiO_2$ powder; or a base material powder formed from B powder.

In regard to the method for manufacturing a base material powder having a carbon nanocoating layer of the present invention, preferably, the polycyclic aromatic hydrocarbon may be selected from the group consisting of coronene, anthanthrene, benzo(ghi)perylene, circulene, corannulene, dicoronylene, diindenoperylene, helicene, heptacene, hexacene, kekulene, ovalene, zethrene, benzo[a]pyrene, benzo[e]pyrene, benzo[a]fluoranthene, benzo[b]fluoranthene, benzo[j]fluoranthene, benzo[k]fluoranthene, dibenz[a,h]anthracene, dibenz[a,j]anthracene, olympicene, pentacene, perylene, picene, tetraphenylene, benz[a]anthracene, benzo[a]fluorene, benzo[c]phenanthrene, chrysene, fluoranthene, pyrene, tetracene, triphenylene, anthracene, fluorene, phenalene, and phenanthrene.

In regard to the method for manufacturing a base material powder having a carbon nanocoating layer of the present invention, preferably, the polycyclic aromatic hydrocarbon may be solid at ambient temperature and atmospheric pressure and have a boiling point temperature that is lower than the thermal decomposition temperature, and the ratio C:H between the number of carbon atoms and the number of hydrogen atoms in the polycyclic aromatic hydrocarbon may be 1:0.5 to 1:0.8. When the ratio C:H is in the range described above, the amount of hydrogen produced by thermal decomposition can be suppressed to a low level to the extent that the influence exerted by hydrogen on the decomposition of the polycyclic aromatic hydrocarbon can be neglected.

The composite of a base material powder and carbon of the present invention is a composite produced by any one method of the methods for producing a positive electrode material for a lithium ion battery as described above.

The electrode of the present invention is an electrode obtainable by mixing the composite of a base material powder and carbon described above with a binder, and then molding the mixture.

According to the present invention, a method for manufacturing $MgB_2$ superconductor by pressure molding a mixture of Mg powder or $MgH_2$ powder and B powder and then heat-treating the molded product includes:

adding a polycyclic aromatic hydrocarbon to the B powder, heating the mixture to a temperature that is higher than or equal to the boiling point of the polycyclic aromatic hydrocarbon and is lower than or equal to the relevant boiling point temperature+300° C., and that is higher than or equal to the thermal decomposition temperature of the polycyclic aromatic hydrocarbon, and thereby coating the surface of the B powder with from 1 layer to 300 layers of carbon atoms or with a layer of carbon having a thickness of from 0.1 nm to 10 nm; and mixing the B powder having a surface coated with carbon atoms or carbon, with the Mg powder or $MgH_2$ powder.

In regard to the method for manufacturing $MgB_2$ superconductor of the present invention, preferably, the amount of addition of the polycyclic aromatic hydrocarbon may be 1 mol % to 40 mol % relative to the theoretical or experimental production amount of $MgB_2$.

In regard to the method for manufacturing $MgB_2$ superconductor of the present invention, preferably, a metal tube may be packed with the mixture, and the metal tube may be pressure-molded and then heat-treated.

In regard to a method for manufacturing $MgB_2$ superconductor of the present invention, preferably, using a base material powder having a carbon nanocoating layer produced by the method described above, the base material powder may be B powder, the method may include packing a metal tube with the B powder having a carbon nanocoating layer and a Mg rod, pressure-molding the metal tube, and then heat-treating the metal tube.

A $MgB_2$ superconductor of the present invention is obtained by the method for manufacturing $MgB_2$ superconductor described above, the $MgB_2$ superconductor is a $MgB_2$ wire having one $MgB_2$ core.

A $MgB_2$ superconductor of the present invention is obtained by the method for manufacturing $MgB_2$ superconductor described above, the $MgB_2$ superconductor may be a multiple $MgB_2$ wire having plural $MgB_2$ cores.

As a unique finding of the present inventors, it was found that when a solid polycyclic aromatic hydrocarbon and a raw material B powder are heated together in a vacuum, the following occurs. First, the polycyclic aromatic hydrocarbon melts and infiltrates into the B powder at a temperature higher than or equal to the melting point of the polycyclic aromatic hydrocarbon, and individual B powder particles are coated with the polycyclic aromatic hydrocarbon. It was found that when the temperature further rises, the polycyclic aromatic hydrocarbon is vaporized and thermally decomposed, the polycyclic aromatic hydrocarbon infiltrates into the B powder, and the surface of the B powder particles are uniformly coated with pyrolytic carbon. Furthermore, it is contemplated that a portion of the polycyclic aromatic hydrocarbon remains on the surface of the B powder and thereby undergoes thermal decomposition even at a temperature higher than or equal to the boiling point, and the remaining polycyclic aromatic hydrocarbon becomes pyrolytic carbon on the surface of the B powder particles. Thus, the inventors of the present invention applied this principle to the method for manufacturing a $MgB_2$ superconducting wire, and thereby devised a technique of coating the surface of a raw material B powder with pyrolytic carbon by heating a solid polycyclic aromatic hydrocarbon at a temperature that is higher than or equal to the boiling point temperature and is higher than or equal to the thermal decomposition temperature. Then, when this B powder coated with pyrolytic carbon is used as a raw material for a powder-in-tube (PIT) method, uniform substitution of B sites with C occurs, and an $MgB_2$ wire having high Jc and excellent uniformity in Jc can be obtained. Even in the case of an internal Mg diffusion (IMD) method, when this B powder coated with a polycyclic aromatic hydrocarbon is used as a raw material, high Jc characteristics and excellent uniformity can be obtained.

Furthermore, the present invention is to provide a new production method of carbon-coating a base material powder that is used for a positive electrode material for a lithium ion battery. That is, the present inventors perform carbon-coating of the surface of $LiFePO_4$ powder using coronene, which is one kind of polycyclic aromatic hydrocarbons (nanographenes), by mixing solid coronene and $LiFePO_4$ powder, vacuum sealing the mixture in a glass tube, and heat-treating the mixture. When the temperature rises, coronene melts, and coronene infiltrates into the $LiFePO_4$ powder. Then, individual $LiFePO_4$ particles are coated with coronene. When the temperature is further increased to be 600° C. or higher, the coronene existing on the surface of the $LiFePO_4$ particles is decomposed. However, at this time, coronene molecules undergo condensation while liberating hydrogen, and this leads to the formation of oligomers, which are deposited on the surface of the $LiFePO_4$ powder, and coating with oligomers occurs. Recognition of this mechanism is a beginning of the present invention. In a case in which the heat treatment temperature is high, since it may be considered that hydrogen atoms are all extracted and the coating is converted to carbon, a carbon coating layer on the surface of the $LiFePO_4$ powder is obtained.

A method for manufacturing a positive electrode material for a lithium ion battery of the present invention is a method for manufacturing a positive electrode material for a lithium ion battery, the positive electrode material having a metal oxide or a metal sulfide that constitutes a positive electrode material for a secondary battery using a non-aqueous electrolyte, and a carbon film covering the surface of the metal oxide or the metal sulfide, and the metal oxide or the metal sulfide being formed from a base material powder for lithium ion battery positive electrode material selected from the group consisting of $SnO_2$, $LiVPO_4$, $LiFePO_4$, $LiNi_{0.5}Mn_{1.5}O_4$, $LiMnPO_4$, $Li_2FeSiO_4$, $V_2O_5$, $MnO_2$, $LiCoO_2$, $LiNiO_2$, $LiNi_{0.5}Mn_{0.5}O_2$, $LiMn_2O_4$, $Li_2S$ and $SiO_2$, the method including adding a polycyclic aromatic hydrocarbon to the base material powder, heating the mixture to a temperature that is higher than or equal to the boiling point of the polycyclic aromatic hydrocarbon and is lower than or equal to the relevant boiling point temperature+300° C., and that is higher than or equal to the thermal decomposition temperature of the polycyclic aromatic hydrocarbon, and thereby coating the surface of the base material powder with from 1 layer to 300 layers of carbon atoms.

At this temperature higher than or equal to (boiling point temperature+300° C.), the vapor pressure of the relevant polycyclic aromatic hydrocarbon becomes too high, and heating of a large amount of a mixture of a base material powder and a polycyclic aromatic hydrocarbon is technically difficult.

In regard to the method for manufacturing a positive electrode material for a lithium ion battery of the present invention, preferably, a polycyclic aromatic hydrocarbon is added to a base material powder, the mixture may be heated to a temperature that is higher than or equal to the boiling point of the polycyclic aromatic hydrocarbon and is lower than or equal to the (boiling point temperature+300° C.), and that is higher than or equal to the thermal decomposition temperature of the polycyclic aromatic hydrocarbon, and thereby, the surface of the base material powder may be coated with a carbon layer having a thickness of from 0.1 nm to 10 nm.

In regard to the method for manufacturing a positive electrode material for a lithium ion battery of the present invention, preferably, the base material powder may be a base material powder for a lithium ion battery positive electrode material selected from the group consisting of $SnO_2$ powder, $LiVPO_4$ powder, $LiFePO_4$ powder, $LiNi_{0.5}Mn_{1.5}O_4$ powder, $LiMnPO_4$ powder, $Li_2FeSiO_4$ powder, $V_2O_5$ powder, $MnO_2$ powder, $LiCoO_2$ powder, $LiNiO_2$ powder, $LiNi_{0.5}Mn_{0.5}O_2$ powder, $LiMn_2O_4$ powder, $Li_2S$ powder, and $SiO_2$ powder.

In regard to a method for manufacturing a positive electrode material for a lithium ion battery of the present invention, preferably, the polycyclic aromatic hydrocarbon may be selected from the group consisting of coronene, anthanthrene, benzo(ghi)perylene, circulene, corannulene, dicoronylene, diindenoperylene, helicene, heptacene, hexacene, kekulene, ovalene, zethrene, benzo[a]pyrene, benzo[e]pyrene, benzo[a]fluoranthene, benzo[b]fluoranthene, benzo[j]fluoranthene, benzo[k]fluoranthene, dibenz[a,h]anthracene, dibenz[a,j]anthracene, olympicene, pentacene, perylene, picene, tetraphenylene, benz[a]anthracene, benzo[a]fluorene, benzo[c]phenanthrene, chrysene, fluoranthene, pyrene, tetracene, triphenylene, anthracene, fluorene, phenalene, and phenanthrene.

In regard to the method for manufacturing a positive electrode material for a lithium ion battery of the present invention, preferably, the polycyclic aromatic hydrocarbon is solid at ambient temperature and atmospheric pressure and has a boiling point temperature that is lower than the thermal decomposition temperature, and the ratio C:H between the number of carbon atoms and the number of hydrogen atoms in the polycyclic aromatic hydrocarbon may be from 1:0.5 to 1:0.8.

For example, as illustrated in FIG. 18, the lithium ion battery of the present invention includes a positive electrode 61 in which a positive electrode active material is provided on positive electrode current collector; and a negative electrode 62 that faces the positive electrode 61, with the liquid electrolyte being interposed therebetween, characterized in that the positive electrode active material has a base material powder formed from a lithium metal oxide and a carbon coating layer coating the periphery of the base material powder, and the carbon coating layer is produced by any one method of the methods for producing a positive electrode material for a lithium ion battery described above.

A method for manufacturing a photocatalyst of the present invention is a method for manufacturing a photocatalyst, the photocatalyst using silver particles and $TiO_2$ particles and employing the TiO$_2$ particles as a base material powder, with the surface of the base material powder being coated with a carbon film, the method including adding a polycyclic aromatic hydrocarbon to the base material powder, heating the mixture to a temperature that is higher than or equal to the boiling point of the polycyclic aromatic hydrocarbon and is lower than or equal to the relevant boiling point temperature+300° C., and that is higher than or equal to the thermal decomposition temperature of the polycyclic aromatic hydrocarbon, and thereby coating the surface of the base material powder with from 1 layer to 300 layers of carbon atoms.

A method for manufacturing a photocatalyst of the present invention is a method for manufacturing a photocatalyst, the photocatalyst using silver particles and TiO$_2$ particles and employing the TiO$_2$ particles as a base material powder, with the surface of the base material powder being coated with a carbon film, the method including adding a polycyclic aromatic hydrocarbon to the base material powder, heating the mixture to a temperature that is higher than or equal to the boiling point of the polycyclic aromatic hydrocarbon and is lower than or equal to the relevant boiling point temperature+300° C., and that is higher than or equal to the thermal decomposition temperature of the polycyclic aromatic hydrocarbon, and thereby coating the surface of the base material powder with a layer of carbon having a thickness of from 0.1 nm to 10 nm.

Advantageous Effects of Invention

According to the method for manufacturing a base material powder having a carbon nanocoating layer of the present invention, since a carbon coating layer is obtained by a simple process of just heat-treating a base material powder and a polycyclic aromatic hydrocarbon together in a vacuum, there is not only an advantage that the production method leads to convenient mass production at low cost, but there is also an advantage that the carbon coating layer thickness can be controlled simply by regulating the amount of addition of the polycyclic aromatic hydrocarbon.

According to the method for manufacturing MgB$_2$ superconductor of the present invention, since a carbon coating layer is obtained by a simple process of just heat-treating B powder together with a polycyclic aromatic hydrocarbon in a vacuum, there is not only an advantage that the production method leads to convenient mass production at low cost, but there is also an advantage that the carbon coating layer thickness can be controlled simply by regulating the amount of addition of the polycyclic aromatic hydrocarbon. That is, an MgB$_2$ superconductor having some of B sites substituted with carbon can be conveniently obtained at low cost, by the method for manufacturing MgB$_2$ superconductor of the present invention.

Furthermore, in the method for manufacturing a base material powder having a carbon nanocoating layer of the present invention, since a base material and a polycyclic aromatic hydrocarbon are simply heat-treated together in a vacuum, it is possible to simply provide a carbon coating layer having a thickness at the nanometer level on various substrates (base materials). Thus, the method is not limited to MgB$_2$ superconductor, and can be applied to a method for manufacturing a positive electrode of a lithium ion battery, a method for manufacturing a photocatalyst, tribology, and the like. Thus, it is assumed that there is available a wide scope of application of the present invention.

According to the method for manufacturing a positive electrode material for a lithium ion battery of the present invention, since a carbon coating layer is obtained by a simple process of just heat-treating a base material powder together with a polycyclic aromatic hydrocarbon in a vacuum, there is an advantage that this production method leads to convenient mass production at low cost, and there is also an advantage that the carbon coating layer thickness can be controlled simply by regulating the amount of addition of the polycyclic aromatic hydrocarbon.

BRIEF DESCRIPTION OF DRAWINGS

FIG. 1A is a diagram illustrating the chemical formulae of the chemical substances used as the polycyclic aromatic hydrocarbon according to an embodiment of the present invention.

FIG. 1B is a diagram illustrating the chemical formulae of the chemical substances used as the polycyclic aromatic hydrocarbon according to an embodiment of the present invention.

FIG. 1C is a diagram illustrating the chemical formulae of the chemical substances used as the polycyclic aromatic hydrocarbon according to an embodiment of the present invention.

FIG. 1D is a diagram illustrating the chemical formulae of the chemical substances used as the polycyclic aromatic hydrocarbon according to an embodiment of the present invention.

FIG. 1E is a diagram illustrating the chemical formulae of the chemical substances used as the polycyclic aromatic hydrocarbon according to an embodiment of the present invention.

FIG. 1F is a diagram illustrating the chemical formulae of the chemical substances used as the polycyclic aromatic hydrocarbon according to an embodiment of the present invention.

FIG. 17 is a set of diagrams explaining the particle size distribution of LiFePO$_4$ base material particles used for a positive electrode material, in which FIG. 17(A) shows the case of LiFePO$_4$ base material particles having no carbon support layer as a Comparative Example, and FIG. 17(B) shows the case of LiFePO$_4$ base material particles having a carbon support layer.

FIG. 19 is a diagram explaining the details of the trial manufacture specifications related to the coin cell illustrated in FIG. 18, and showing the mechanical design values of the positive electrode and the negative electrode.

FIG. 20 is a diagram explaining the details of a test product produced according to the trial manufacture specifications related to the coin cell illustrated in FIG. 18.

FIG. 21 is a diagram explaining the discharge capacity characteristics of the test product related to a Test Example of the present invention.

DESCRIPTION OF EMBODIMENTS

Figure 2:
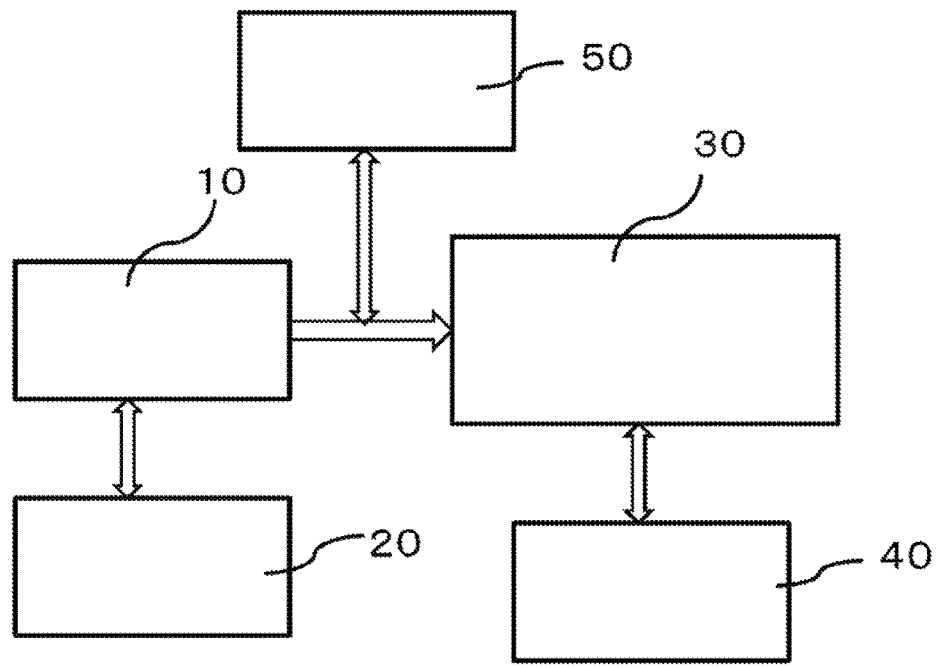
FIG. 2 is a configuration diagram explaining an apparatus for producing the positive electrode material for a lithium ion battery of the present invention.

Hereinafter, embodiments of the present invention will be explained in detail using the drawings and the tables.

First, an embodiment in which the method for manufacturing a base material powder having a carbon nanocoating layer of the present invention is applied to a method for manufacturing MgB$_2$ superconductor, will be described. Meanwhile, with regard to the terms used in the present specification, the definitions are described below.

The "internal Mg diffusion method" is a method for producing wire by disposing an Mg rod inside a metal tube, packing the gaps between the metal tube and the Mg rod with B powder, processing this composite into wire, and then heat-treating the wire.

The "powder-in-tube method" is a method for producing wire by packing a metal tube with a raw material powder of a superconductor, processing the composite into wire, and then heat-treating the wire.

The "critical current density Jc" refers to the maximum superconducting current density that can be passed per unit cross-sectional area of a superconducting wire. Usually, the critical current density refers to a value per unit cross-sectional area of the superconductor core in the wire.

According to the present embodiment, MgB$_2$ superconductor is produced by pressure molding a mixture of Mg powder or MgH$_2$ powder and B powder, and heat-treating the molded product.

In regard to the Mg powder, MgH$_2$ powder and B powder used as raw materials, powders having a purity or a particle size similar to those of the conventional powders such as described in Patent Literatures 1 to 3 related to the proposal of the present applicant, can be used by appropriately regulating the mixing ratio of the powders. For example, in regard to the particle size, the average particle size of the Mg powder or the MgH$_2$ powder is preferably in the range of 200 nm to 50 μm, and the average particle size of the B powder is preferably in the range of 50 nm to 1 μm. In regard to the mixing ratio, it is preferable that the powders are mixed at a molar ratio in the range of Mg or MgH$_2$/B=0.5/2 to 1.5/2, and it is more preferable that the powders are mixed at a molar ratio in the range of 0.8/2 to 1.2/2. Then, appropriate amounts of a polycyclic aromatic hydrocarbon and SiC can be added to the mixture of Mg or MgH$_2$ powder and B powder, or to B powder, and the mixture can be sufficiently mixed in a ball mill or the like.

In regard to the polycyclic aromatic hydrocarbon (nanographene), various compounds among those compounds having a carbocyclic ring or a heterocyclic ring with three or more rings may be considered, and the number of carbon atoms of the polycyclic aromatic hydrocarbon is not particularly limited; however, the number of carbon atoms is preferably in the range of 18 to 50. The polycyclic aromatic hydrocarbon may have various functional groups as long as the operating effects of the present invention are not inhibited, and the polycyclic aromatic hydrocarbon can be appropriately selected in consideration of the easy availability, handleability, price, and the like. For example, a typical example of the substituent may be an alkyl group having 1 to 8 carbon atoms, and particularly 1 to 4 carbon atoms, or the like. More specific examples thereof include coronene, anthracene, perylene, and biphenyl listed in Table 1 and Table 2 (FIGS. 1A to 1F); alkyl-substituted carbocyclic aromatic hydrocarbons; and heterocyclic aromatic hydrocarbons such as thiophene. Furthermore, in regard to the amount of addition of the polycyclic aromatic hydrocarbon, it is preferable to add the polycyclic aromatic hydrocarbon at a proportion of 0.1 mol % to 40 mol % relative to the theoretical or experimental production amount of MgB$_2$.

TABLE 1

| Name | Chemical formula | Melting point [° C.] | Boiling point [° C.] |
| --- | --- | --- | --- |
| Coronene (or superbenzene) | $C_{24}H_{12}$ | 438 | 525 |
| Anthanthrene | $C_{22}H_{12}$ | 261 | 497 |
| Benzo(ghi)perylene | $C_{22}H_{12}$ | 278 | 500 |
| Circulene | $C_{28}H_{14}$ | 295 | 604 |
| Corannulene | $C_{20}H_{10}$ | 268 | 438 |
| Dicoronylene | $C_{20}H_{10}$ | Not published | Not published |
| Diindenoperylene | $C_{32}H_{16}$ | Not published | >330 |
| Helicene | $C_{26}H_{16}$ | Not published | Not published |
| Heptacene | $C_{30}H_{18}$ | Not published | 677 |
| Hexacene | $C_{26}H_{16}$ | Not published | 604 |
| kekulene | $C_{48}H_{24}$ | Not published | Not published |
| Ovalene | $C_{32}H_{14}$ | 475 | Not published |
| Zethrene | $C_{24}H_{14}$ | 262 | 583 |
| Benzopyrene | $C_{20}H_{12}$ | 179 | 495 |
| Benzo(a)pyrene | $C_{20}H_{12}$ | 179 | 495 |
| Benzo(e)pyrene | $C_{20}H_{12}$ | 178 | 493 |
| Benzo(a)fluoranthene | $C_{20}H_{12}$ | 150 | 468 |
| Benzo(b)fluoranthene | $C_{20}H_{12}$ | 168 | 481 |
| Benzo(j)fluoranthene | $C_{20}H_{12}$ | 165 | 480 |

TABLE 1-continued

| Name | Chemical formula | Melting point [° C.] | Boiling point [° C.] |
|---|---|---|---|
| Benzo(k)fluoranthene | $C_{20}H_{12}$ | 217 | 480 |
| Dibenz(a,h)anthracene | $C_{22}H_{14}$ | 262 | 524 ± 17 |
| Dibenz(a,j)anthracene | $C_{22}H_{14}$ | 196 | 524 ± 17 |

TABLE 2

| Name | Chemical formula | Melting point [° C.] | Boiling point [° C.] |
|---|---|---|---|
| Olympicene | $C_{19}H_{12}$ | Not published | 511 |
| Prentacene | $C_{22}H_{14}$ | 268 | 524 ± 17 |
| Perylene | $C_{20}H_{12}$ | 276 | 497 |
| Picene | $C_{22}H_{14}$ | 366 | 519 |
| Tetraphenylene | $C_{24}H_{16}$ | 232 | 578 ± 17 |
| Benz(a)anthracene | $C_{18}H_{12}$ | 158 | 438 |
| Benzo(a)fluorene | $C_{17}H_{12}$ | 189.5 | 405 |
| Benzo(c)phenanthrene | $C_{18}H_{12}$ | 159 | 436 ± 12 |
| Chrysene | $C_{18}H_{12}$ | 254 | 448 |
| Fluoranthene | $C_{16}H_{10}$ | 110.8 | 375 |
| Pyrene | $C_{16}H_{10}$ | 145 | 404 |
| Tetracene | $C_{18}H_{12}$ | 357 | 437 ± 12 |
| Triphenylene | $C_{18}H_{12}$ | 198 | 438 |
| Anthracene | $C_{14}H_{10}$ | 218 | 340 |
| Fluorene | $C_{13}H_{10}$ | 116 | 295 |
| Phenalene | $C_{13}H_{10}$ | 70-75 | 290 |
| Phenanthrene | $C_{14}H_{10}$ | 101 | 332 |

Meanwhile, the boiling points and melting points of the polycyclic aromatic hydrocarbons (nanographenes) of Table 1 and Table 2 described above, are based on the database of SciFinder (American Chemical Society; https://scifinder.cas.org/scifinder/), and in a case in which measured values are not available, the boiling points and the melting points are based on calculated values (Calculated using Advanced Chemistry Development (ACD/Labs) Software V11.02).

A mixture such as described above is processed into a bulk material or a wire, and methods and conditions similar to the conventional methods and conditions for superconducting wire may be employed. A bulk material can be produced by performing pressure molding and a heat treatment, and for example, pressing using a conventional mold may be used. The pressure is preferably 100 kg/cm² to 300 kg/cm². A wire can be produced by, for example, packing a metal tube made of iron or the like with a mixture, processing the composite into a tape or a wire using a rolling roll or the like, and then heat-treating the tape or wire. In regard to the conditions, conditions similar to the conventional conditions may be employed. That is, according to the common usage, production can be carried out by performing a heat treatment under the conditions of temperature and time that are sufficient to obtain an $MgB_2$ superconducting phase, in an inert atmosphere of argon, vacuum or the like.

Furthermore, the metal tube used, the heat treatment temperature, and the heat treatment time are not intrinsic to the substitution of B sites with C, and therefore, various metal tubes, heat treatment temperatures, and heat treatment times can be selected.

The $MgB_2$ superconductor of the present invention obtained as described above is useful for the capacity enhancement of superconducting linear motor cars, MRI medical diagnostic apparatuses, semiconductor single crystal pulling apparatuses, superconducting energy storages, superconducting rotating machines, superconductor transformers, superconducting cables, and the like.

Next, an embodiment in which the method for manufacturing a base material powder having a carbon nanocoating layer of the present invention is applied to a method for manufacturing a positive electrode material for a lithium ion battery, will be described. Here, the case of using $LiFePO_4$ will be described as an example.

In regard to the $LiFePO_4$ powder used as a raw material, a powder having purity or a particle size such as those of conventional powders can be used by appropriately regulating the mixing ratio. For example, in regard to the particle size, the average particle size of the $LiFePO_4$ powder is preferably in the range of 200 nm to 50 μm. Regarding the mixing ratio, it is preferable to mix the powders at a molar ratio in the range of $LiFePO_4/C$=1.0/0.001 to 1.0/5.0, and it is more preferable that the powders are mixed at a molar ratio in the range of 1.0/0.01 to 1.0/1.0. In a case in which the amount of addition of carbon is less than 0.1 mol %, there is a disadvantage that a satisfactory carbon coating film is not formed, which is not preferable. In a case in which the amount of addition of carbon is more than 500 mol %, there is a disadvantage that a non-uniform thick carbon coating layer is formed, which is not preferable. Then, an appropriate amount of a polycyclic aromatic hydrocarbon is added to the $LiFePO_4$ powder, and the mixture can be sufficiently mixed in a ball mill or the like.

Meanwhile, the lithium-containing powder for a positive electrode is not limited to the $LiFePO_4$ powder, and examples of the lithium-containing powder that are conventionally used include $LiCoO_2$ powder, $LiNiO_2$ powder, $LiNi_{0.5}Mn_{0.5}O_2$ powder, $LiMn_2O_4$ powder, $LiMnPO_4$ powder, and $LiFeSiO_4$ powder, as well as $LiVPO_4$ powder, $LiNi_{0.5}Mn_{1.5}O_4$ powder, $V_2O_5$ powder, $SiO_2$ powder, $MnO_2$ powder, and $Li_2S$ powder.

In regard to the polycyclic aromatic hydrocarbon (nanographene), various substances among those compounds having a carbocyclic ring or a heterocyclic ring with three or more rings may be considered, and the number of carbon atoms of the polycyclic aromatic hydrocarbon is not particularly limited; however, the number of carbon atoms is preferably in the range of 18 to 50. The polycyclic aromatic hydrocarbon may have various functional groups as long as the operating effects of the present invention are not inhibited, and the polycyclic aromatic hydrocarbon may be appropriately selected in consideration of easy availability, handleability, price, and the like. For example, a typical example of the substituent may be an alkyl group having 1 to 8 carbon atoms, and particularly 1 to 4 carbon atoms, or the like. More specific examples include coronene, anthracene, perylene, and biphenyl listed in Table 1 and Table 2 described above; alkyl-substituted carbocyclic aromatic hydrocarbons; and heterocyclic aromatic hydrocarbons such as thiophene.

Furthermore, in regard to the amount of addition of the polycyclic aromatic hydrocarbon, it is essential to express the amount of addition in the unit of mol % of carbon described above; however, in regard to the production operation, it is convenient to replace the mol % of carbon with mol % or mass % of the polycyclic aromatic hydrocarbon.

FIG. 2 is a configuration diagram explaining an apparatus for producing the positive electrode material for a lithium ion battery of the present invention. In the diagram, the production apparatus is configured to include a container 10, a vacuum state retaining means 20, a heating apparatus 30, a heat treatment controlling apparatus 40, and a conveyance apparatus 50.

The container 10 is a container for accommodating a mixture obtained by adding a polycyclic aromatic hydrocarbon to a base material powder used for a positive electrode material for a lithium ion battery, and the container is formed from a material which is not reactive with the base material powder or the polycyclic aromatic hydrocarbon. Examples of the relevant material include ceramics, metals, and glass.

The vacuum state retaining means 20 is a means for maintaining the container 10 in a state of accommodating the mixture, to be in a vacuum state. For example, in a case in which the container 10 is made of glass, a vacuum pump, a burner that seals glass, and the like are used. In a case in which the container 10 is made of ceramics, a vacuum container that covers the entirety of the ceramic container 10, and a vacuum pump are used. In a case in which the container 10 is made of a metal, a vacuum container that covers the entirety of the metal container 10, and a vacuum pump may be used, and a vacuum state may be drawn inside the metal container 10 by connecting a vacuum pump to the metal container 10.

The heating apparatus 30 is an apparatus that heats the container 10 in a state of accommodating the mixture, to a temperature that is higher than or equal to the boiling point of the polycyclic aromatic hydrocarbon and lower than or equal to the (boiling point temperature+300° C.), and that is higher than or equal to the thermal decomposition temperature of the polycyclic aromatic hydrocarbon. For example, the heating apparatus 30 is a combination of refractory bricks and an electric heater.

The heat treatment controlling apparatus 40 controls the heating time in the heating apparatus 30 to be secured for a predetermined time in which the surface of the base material powder is covered with from 1 layer to 300 layers of carbon atoms. The heat treatment controlling apparatus 40 includes a temperature sensor that measures the internal temperature of the container 10, or a regulator that controls the amount of heat generation of the heating apparatus 30. For the regulator, a temperature regulating system memorizing the heat treatment pattern of the heating apparatus 30 may be used.

The conveyance apparatus 50 is a mechanism that conveys the container 10 in a vacuum state with the mixture accommodated therein into the heating apparatus 30, and also includes a mechanism that conveys the container 10 after being heat-treated in the heating apparatus 30 to the outside of the heating apparatus 30. For the conveyance apparatus 50, for example, a manipulator or a conveyance robot can be employed.

Hereinafter, the present invention will be explained in more detail by way of Examples. The present invention is definitely not intended to be limited by the following Examples.

EXAMPLES

Example 1

Figure 3:
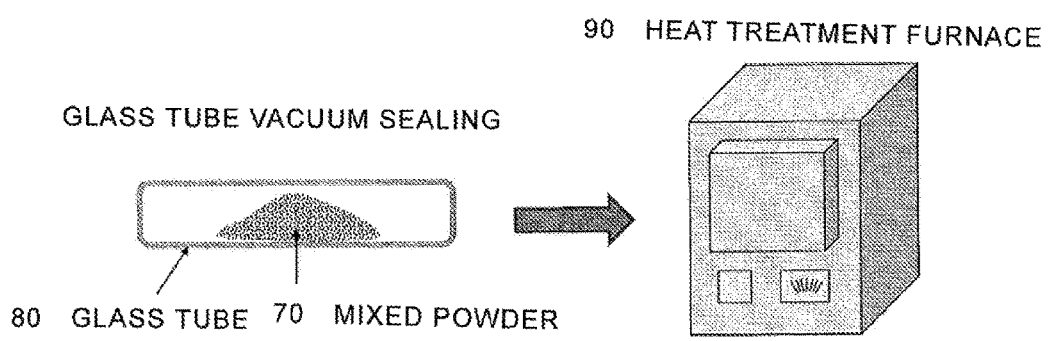
FIG. 3 is a configuration diagram of a carbon coating apparatus used in Example 1 of the present invention.
Figure 4:
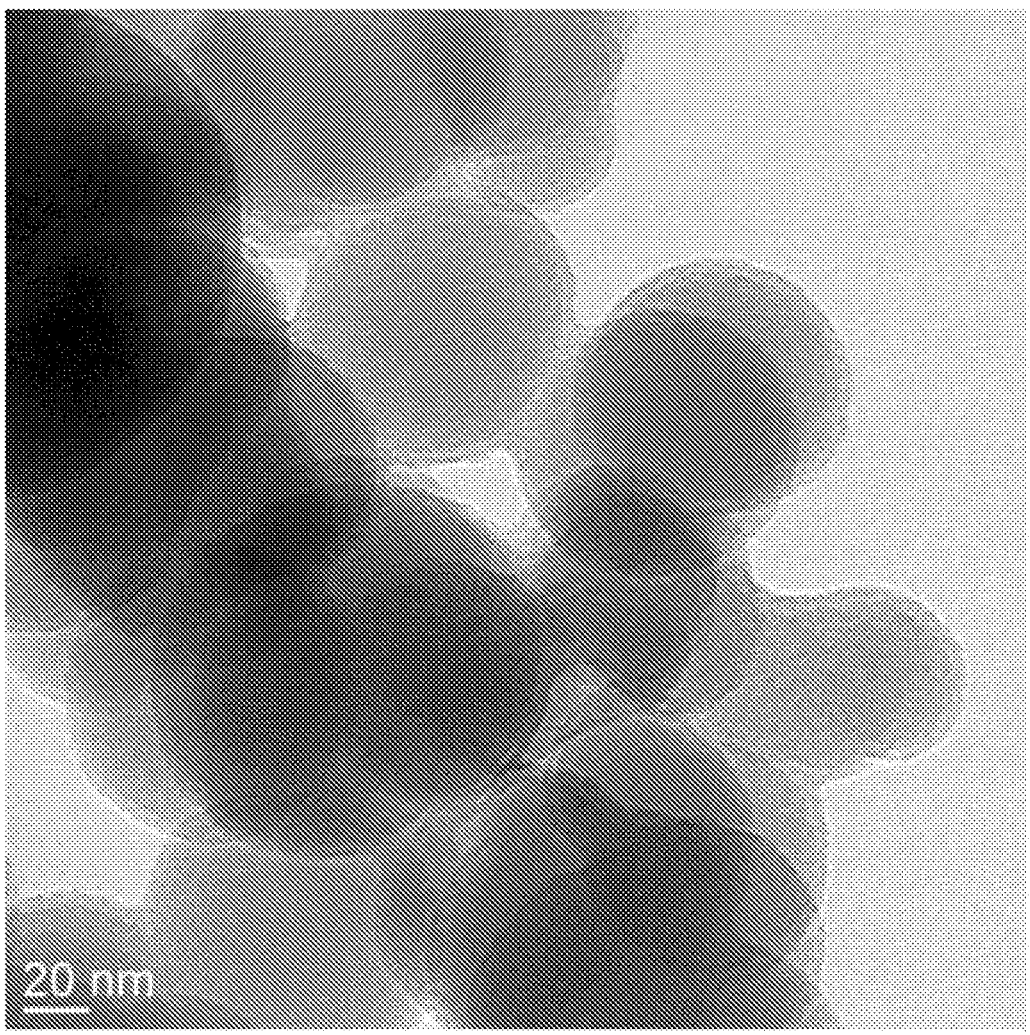
FIG. 4 is a transmission electron microscopic image of a boron nanopowder that was heat-treated in a vacuum for 3 hours at 630° C. together with coronene in one of the examples of the present invention.
Figure 5:
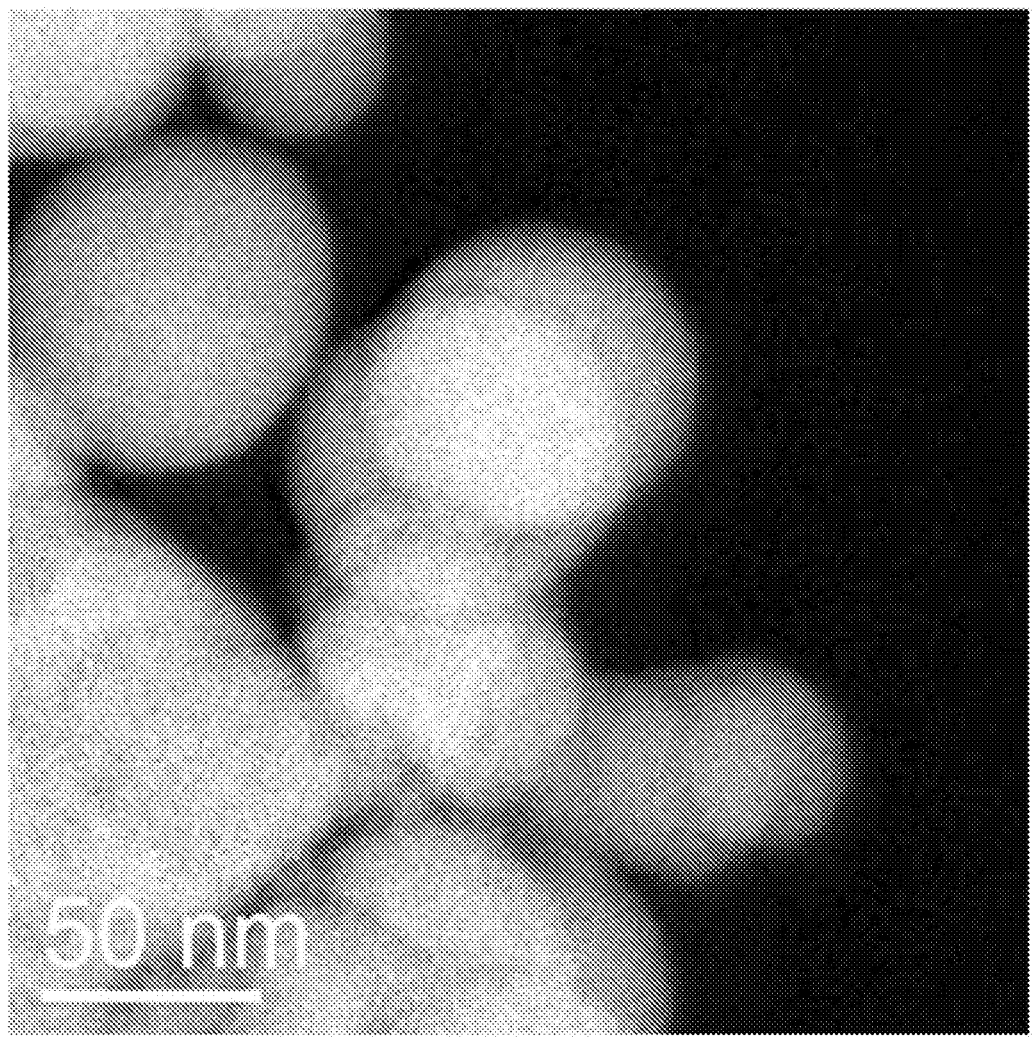
FIG. 5 is a boron mapping diagram for a boron nanopowder that was heat-treated together with coronene in a vacuum for 3 hours at 630° C.

FIG. 3 is a configuration diagram of a carbon coating apparatus used in the Examples of the present invention. In the diagram, reference numeral 70 represents a mixed powder of B+coronene, reference numeral 80 represents a glass tube, and reference numeral 90 represents a heat treatment furnace. An amorphous B nanopowder (manufactured by Pavezyum Company, Turkey) having a particle size of about 250 nm and a coronene ($C_{24}H_{12}$) solid powder having a particle size of several millimeters (mm) were weighed such that the amount of carbon with respect to B was 5 atom %. The powders were mixed in a mortar, and the mixture was vacuum sealed in a quartz tube. This was transferred into a heat treatment furnace and was subjected to a heat treatment for 3 hours at 630° C. Furthermore, for a comparison, the same mixture was subjected to a heat treatment for 1 hour at 520° C., which is lower than the boiling point (525° C.) of coronene. An observation of the structure of the B powder obtained after the heat treatment was made by transmission electron microscopy. For a sample that had been heat-treated at 630° C., FIG. 4 presents a transmission electron microscopic image; FIG. 5 presents the analysis results for B (boron mapping diagram); and FIG. 6 presents the analysis results for carbon (carbon mapping diagram).

Figure 6:
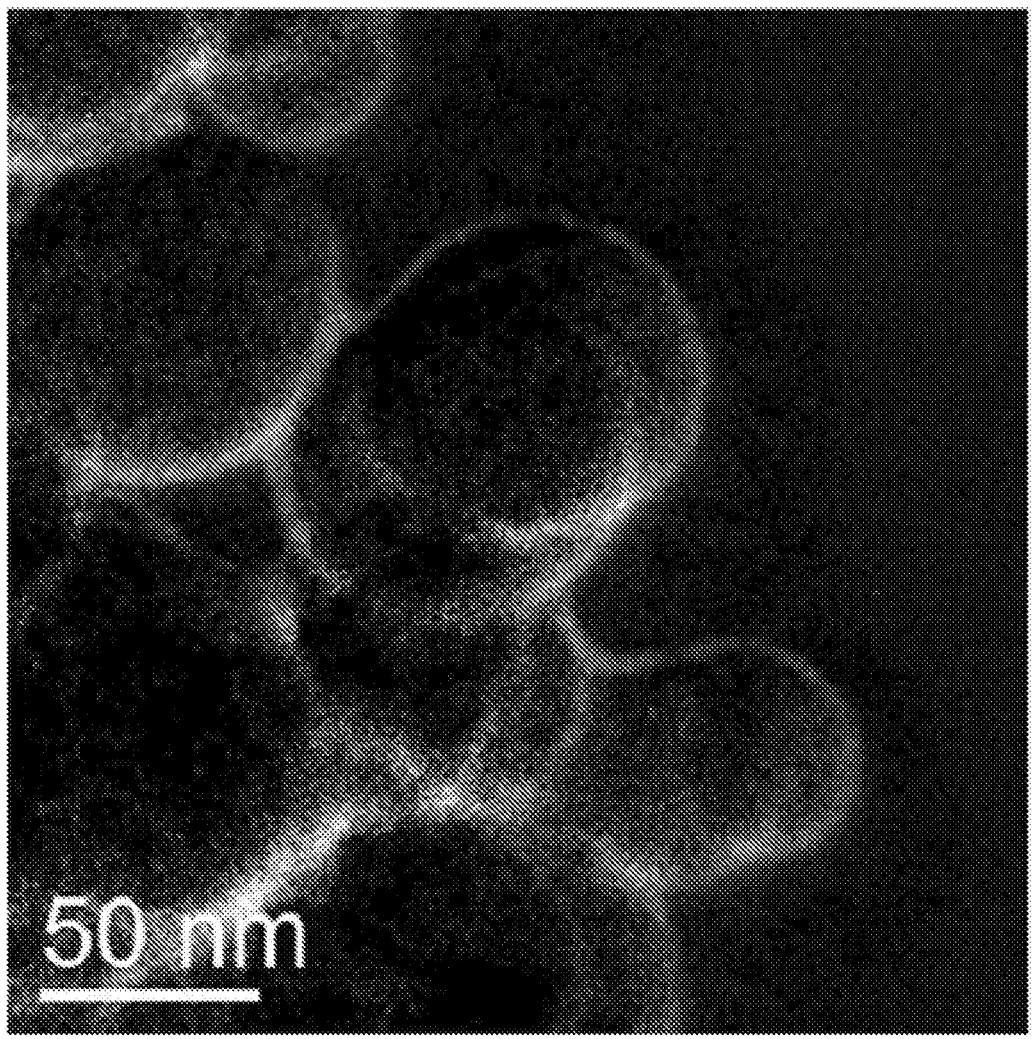
FIG. 6 is a carbon mapping diagram for a boron nanopowder that was heat-treated together with coronene in a vacuum for 3 hours at 630° C.
Figure 7:
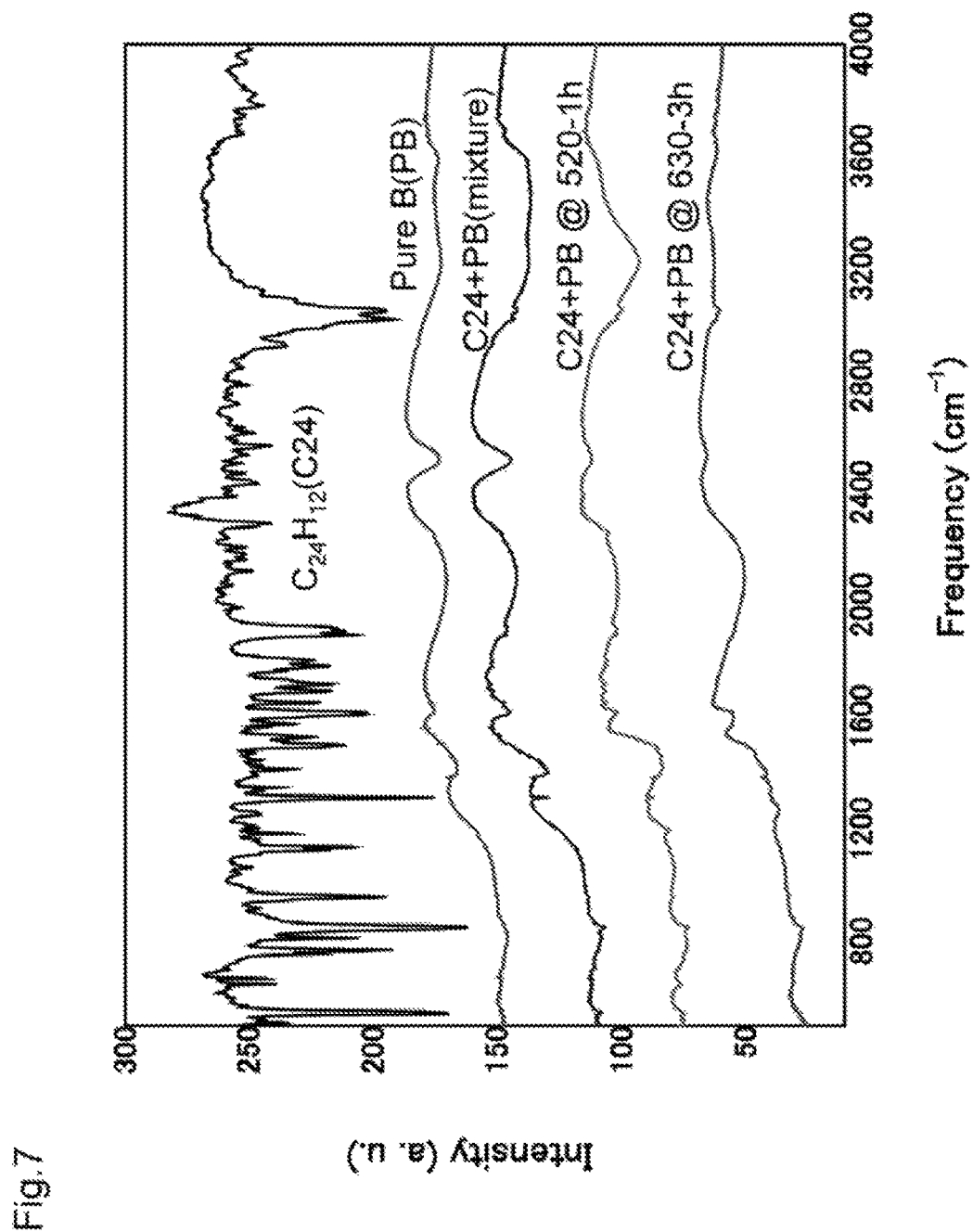
FIG. 7 is a diagram illustrating the results of an infrared spectroscopic analysis of B powder after a vacuum heat treatment, a mixed powder of coronene and B (non-heat-treated), B powder, and coronene powder.
Figure 8:
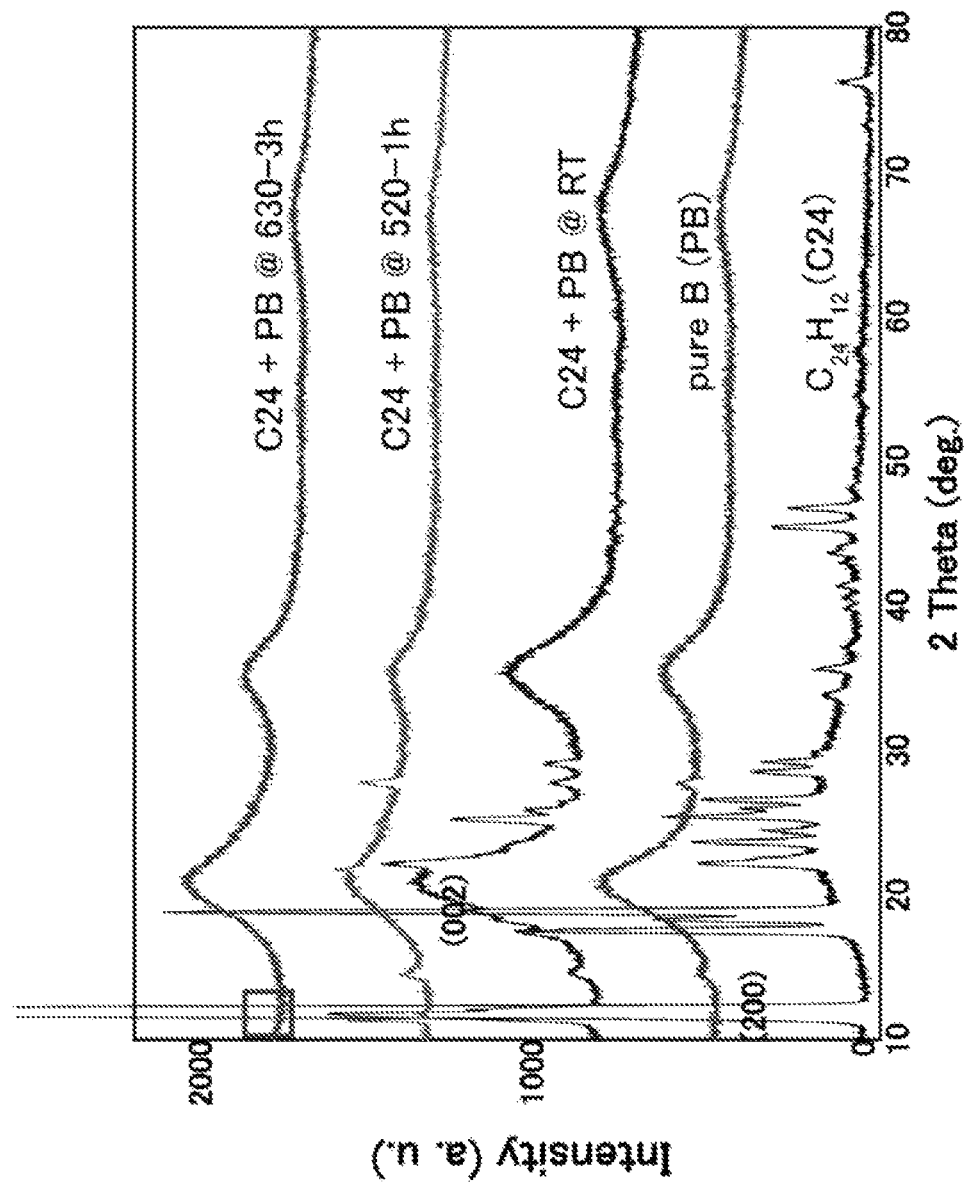
FIG. 8 is a diagram illustrating the X-ray diffraction patterns of B powder after a vacuum heat treatment, a mixed powder of coronene and B (non-heat-treated), B powder, and coronene powder.

It can be seen from FIG. 4 that an amorphous layer having a thickness of 3 nm to 4 nm exists on the surface of the B particles, and it can be seen from FIG. 6 that this layer is a layer containing carbon. FIG. 7 shows the results of an infrared spectroscopic analysis of a vacuum sealed and heat-treated B powder, a mixed powder of B and coronene (non-heat-treated), only B powder, and coronene powder. FIG. 8 shows the results of X-ray diffraction.

In regard to the infrared spectroscopic analysis, peaks characteristic to the C—H bond of coronene are seen in the sample that was heat-treated at 520° C.; however, these peaks have almost disappeared in the B powder sample that was heat-treated at 630° C. Furthermore, in regard to the X-ray diffraction, peaks of coronene are seen to a slight extent in the sample that was heat-treated at 520° C.; however, the peaks of coronene or the peaks of the oligomers resulting from condensation of coronene are not seen in the sample that was heat-treated at 630° C. The melting point of coronene is 438° C., while the boiling point is 525° C., and it is assumed that at the heat treatment temperature 630° C., coronene is evaporated to become a gas. According to Non-Patent Literature 3, it is reported that in a case in which coronene is vaporized by heating, condensation between coronene occurs in sequence, oligomers are formed while hydrogen is extracted, and thereby carbon is left at or above 600° C. Furthermore, it is also speculated from Non-Patent Literature 4 that a portion of coronene exists on the surface of the B powder particles even at a temperature higher than or equal to the boiling point, is converted to carbon by thermal decomposition, and exists in that state on the surface of B particles. Therefore, it is considered that the deposit layer having a thickness in the order of nanometers on the surface of B particles that were heat-treated at 630° C. in this experiment is a carbon layer.

Example 2

Next, an $MgB_2$ superconducting wire was produced by the internal Mg diffusion method using the carbon-coated B powder produced in Example 1. An Mg rod having a diameter of 2 mm was disposed at the center of an iron tube having an outer diameter of 6 mm and an inner diameter of 4 mm, the gaps between the iron tube and the Mg rod were packed with B powder. This was processed into a wire having a diameter of 0.6 mm by means of a grooved roll and die wire drawing. This wire was heat-treated in an argon atmosphere at 657° C. for 8 hours. For a comparison, an $MgB_2$ wire was produced in the same manner using a carbon-coated B powder produced by the RF plasma method. Since the B powder according to the present invention did not contain impurities such as Cl, the B powder exhibits a higher critical current density than the B powder in the case of the RF plasma method.

Example 3

Novel Production of Base Material Particles Having Carbon Support Layer

A commercially available $LiFePO_4$ nanopowder having an average particle size of about 5 μm and a solid coronene ($C_{24}H_{12}$) powder were weighed such that the amount of carbon (C) with respect to $LiFePO_4$ was 5 mol %, the powders were mixed in a mortar, and the mixture was vacuum sealed in a quartz tube. This was subjected to a heat treatment for one hour at 700° C. An observation of the structure of the $LiFePO_4$ powder obtained after the heat treatment was made by transmission electron microscopy.

Figure 9:
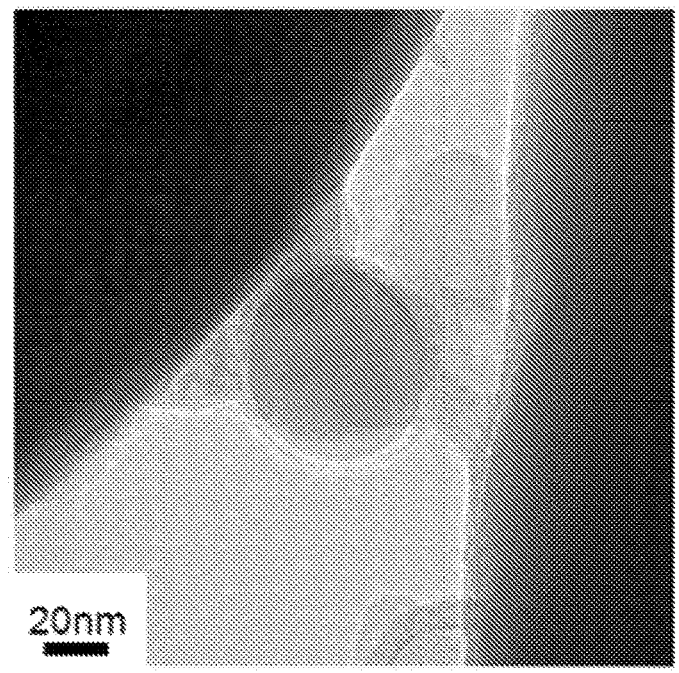
FIG. 9 is a transmission electron microscopic image of a LiFePO$_4$ powder that was heat-treated together with coronene in a vacuum for one hour at 700° C. in another embodiment of the present invention.
Figure 10:
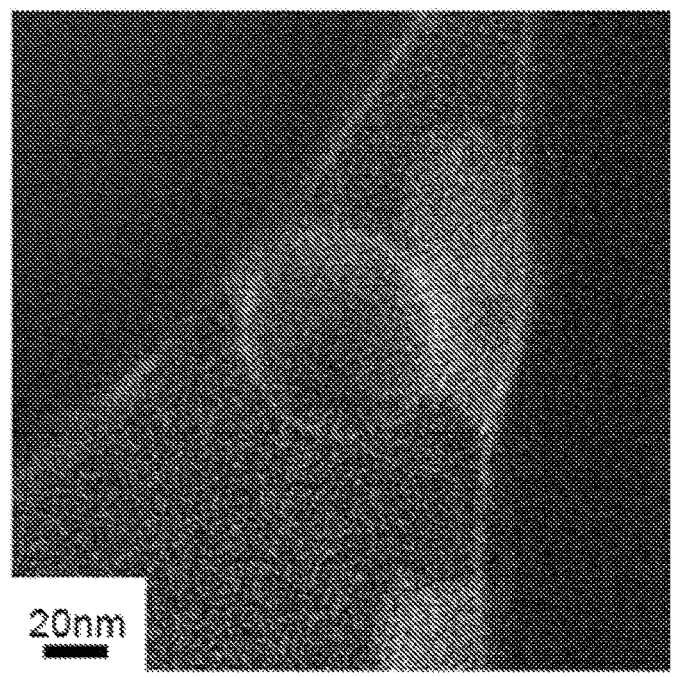
FIG. 10 is a carbon mapping diagram corresponding to the transmission electron microscopic image of the LiFePO$_4$ powder of FIG. 9.
Figure 11:
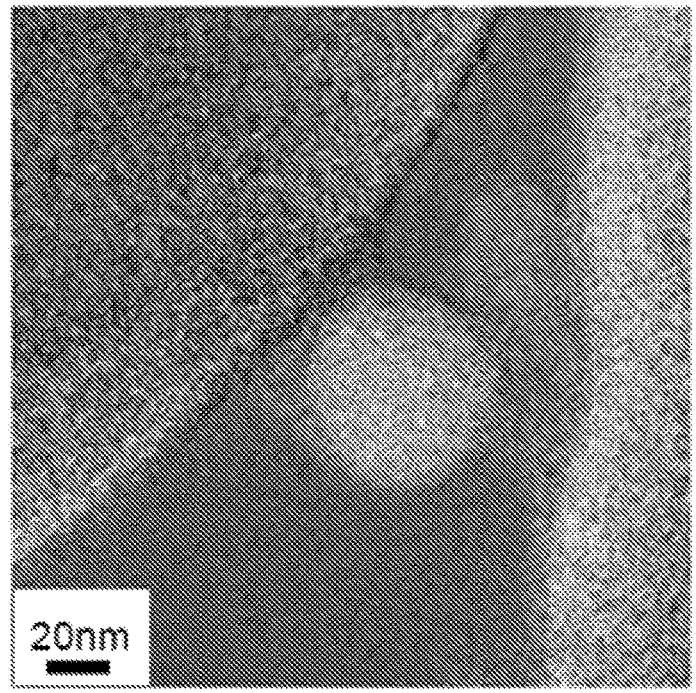
FIG. 11 is a lithium mapping diagram corresponding to the transmission electron microscopic image of the LiFePO$_4$ powder of FIG. 9.
Figure 12:
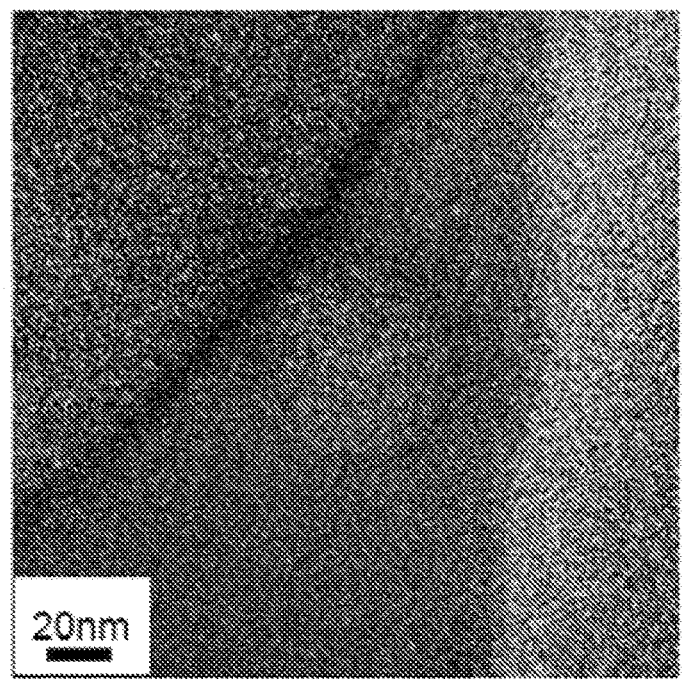
FIG. 12 is an iron mapping diagram corresponding to the transmission electron microscopic image of the LiFePO$_4$ powder of FIG. 9.
Figure 13:
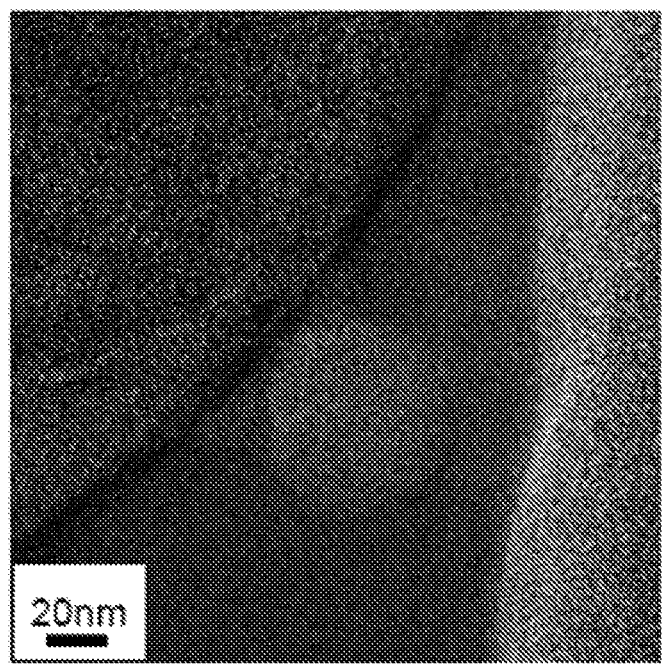
FIG. 13 is a phosphorus mapping diagram corresponding to the transmission electron microscopic image of the LiFePO$_4$ powder of FIG. 9.
Figure 14:
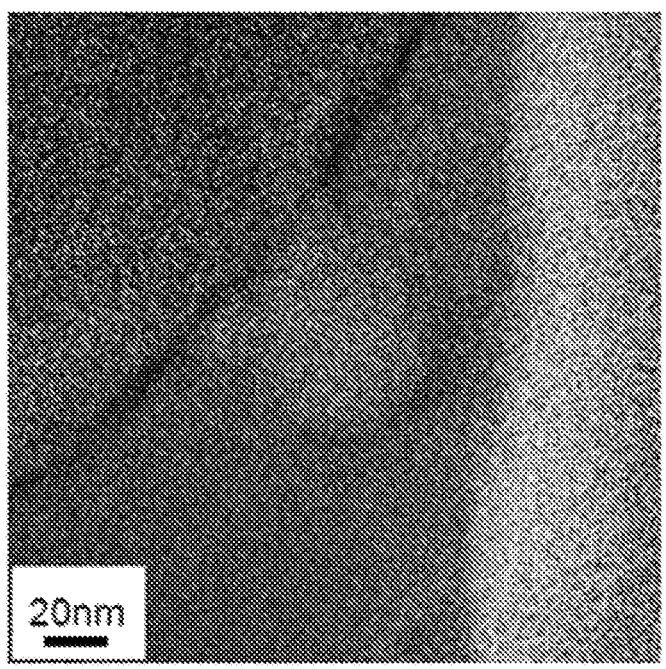
FIG. 14 is an oxygen mapping diagram corresponding to the transmission electron microscopic image of the LiFePO$_4$ powder of FIG. 9.

FIG. 9 is a transmission electron microscopic image of a $LiFePO_4$ powder that was vacuum heat-treated together with coronene for one hour at 700° C. as an embodiment of the present invention. FIG. 10 to FIG. 14 are diagrams showing the elemental analysis mapping of C, Li, Fe, P, and O, respectively, for the $LiFePO_4$ powder that was vacuum heat-treated together with coronene for one hour at 700° C.

It is confirmed from FIG. 9 that a layer having a thickness of 3 nm to 4 nm exists on the surface of $LiFePO_4$ particles. Also, it is understood from FIG. 10 to FIG. 14 that this layer is a layer containing C. Since the melting point of coronene is 438° C., and the boiling point is 525° C., it may be assumed that at the heat treatment temperature 700° C., coronene does not exist on the surface of the $LiFePO_4$ particles. According to Non-Patent Literature 1 described above, it is reported that in a case in which coronene is heated, condensation between coronene molecules occurs in sequence, oligomers are formed while hydrogen is extracted, and most of hydrogen is extracted at or above 600° C., so that the layer is converted to carbon.

Figure 15:
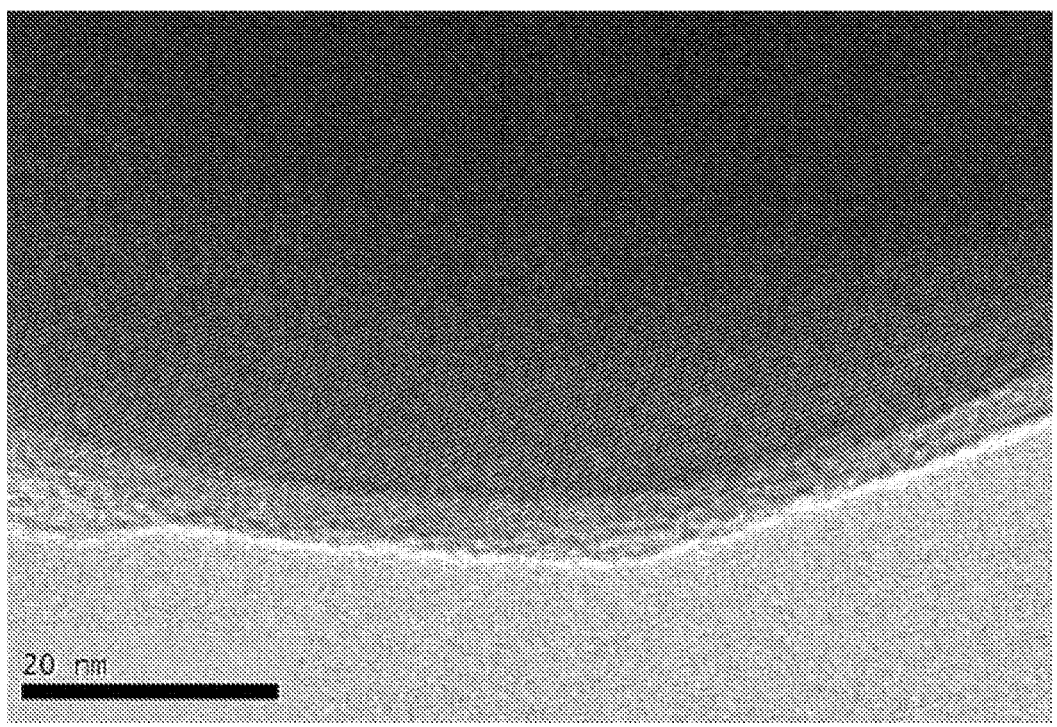
FIG. 15 is a high-resolution transmission electron microscopic image of a LiFePO$_4$ powder that was heat-treated together with coronene in a vacuum for one hour at 700° C.

FIG. 15 presents a high-resolution transmission electron microscopic image, and it is understood from this that this carbon layer is amorphous. Therefore, it is assumed that the deposit layer having a thickness in the order of nanometers, which covers the surface of $LiFePO_4$ particles that were heat-treated at 700° C. in this experiment is an amorphous carbon layer. This heat treatment process is considered to involve the following. When the heat treatment temperature rises, first, coronene melts and infiltrates into $LiFePO_4$ powder, and coronene covers the surface of individual $LiFePO_4$ powder particles. It is speculated that when this temperature reaches 600° C. or higher, the coronene on the surface of the $LiFePO_4$ particles is decomposed, and carbon remains in an amorphous form. Since this coronene on the surface of the $LiFePO_4$ particles becomes a barrier, and aggregation and coarsening of the $LiFePO_4$ particles is suppressed, as illustrated in FIG. 9, the $LiFePO_4$ particles can maintain a size at the nanometer level even after a heat treatment. This is a major advantage for an electrode material.

Figure 16:
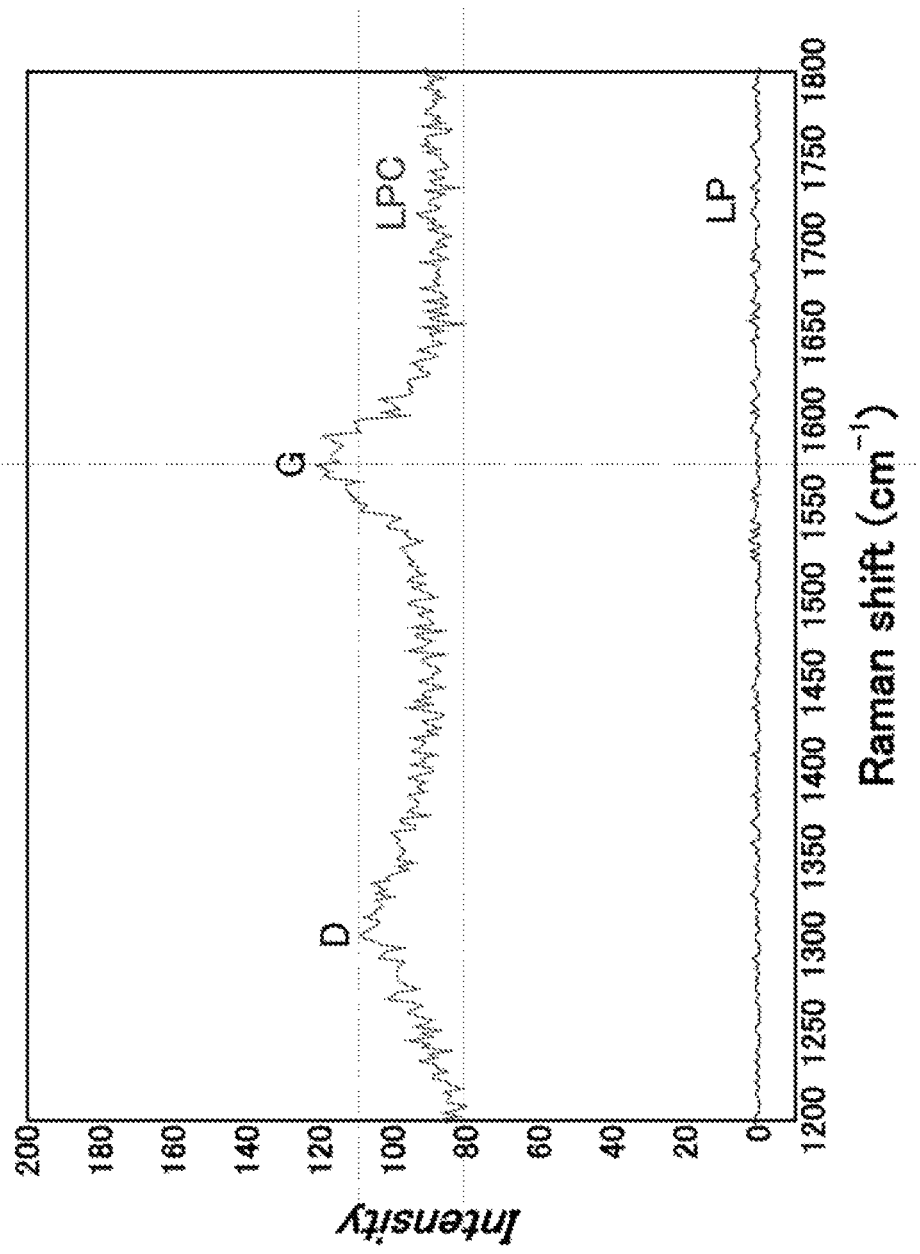
FIG. 16 is a set of Raman scattering shift diagrams of a LiFePO$_4$ powder that was heat-treated together with coronene in a vacuum for one hour at 700° C. and of a LiFePO$_4$ powder that was not heat-treated in a vacuum.

In amorphous carbon, conductive $sp^2$ bonds and insulating $sp^a$ bonds are co-present; however, regarding a coating film of an electrode material, it is necessary that conductive $sp^2$ bonds exist in a large quantity. FIG. 16 shows the Raman scattering shift of a carbon-coated $LiFePO_4$ powder obtained through a heat treatment at 700° C., and a $LiFePO_4$ powder that was not carbon-coated. The carbon-coated $LiFePO_4$ exhibits two peaks (D and G peaks), and it can be seen that these peaks are attributable to the carbon coating layer. From Non-Patent Literature 2, the ratio of $sp^2$ bonds can be evaluated from the ratio of peak intensities of the D peak and the G peak, I(D)/I(G), and the magnitude of the shift of the G peak based on graphite, can be evaluated, and from the data of FIG. 16, the proportion of $sp2$ bonds is evaluated to be 80% or more. From the above results, it is considered that the carbon nanofilm produced herein has sufficient electrical conductivity, and is suitable as a carbon film coating for an electrode material.

Comparative Example 1

Novel Production of Base Material Particles Having Carbon Support Layer

Several methods of coating the surface of $LiFePO_4$ particles with C have been reported, and one of them is the method of using methanol as described above (Non Patent Literature 6). $LiFePO_4$ is introduced into a kiln having a rotating function (rotary kiln), and then the temperature is increased to 600° C. Subsequently, methanol vapor is supplied into this furnace by using nitrogen as a carrier gas, and thereby a carbon-supported $LiFePO_4$/C composite positive electrode material is obtained.

However, this method requires a rotary kiln, the process is not simple, and the method is not necessarily an inexpensive method. According to one Example of the present invention, a convenient method of vacuum sealing $LiFePO_4$ and coronene in a glass tube and heating the tube is used, and this method is characterized in that mass production is easily achieved. Furthermore, the present invention also has an advantage that the amount of C coating can be controlled simply by varying the ratio between $LiFePO_4$ and coronene.

Test Example 1

Production of Electrode Sheet

Next, the production of an electrode sheet for a lithium ion battery related to an embodiment of the present invention using the base material particles having a carbon support layer produced in Example 3 as a positive electrode material, will be explained. The electrode sheet has a positive electrode sheet and a negative electrode sheet as a pair.

Figure 17:
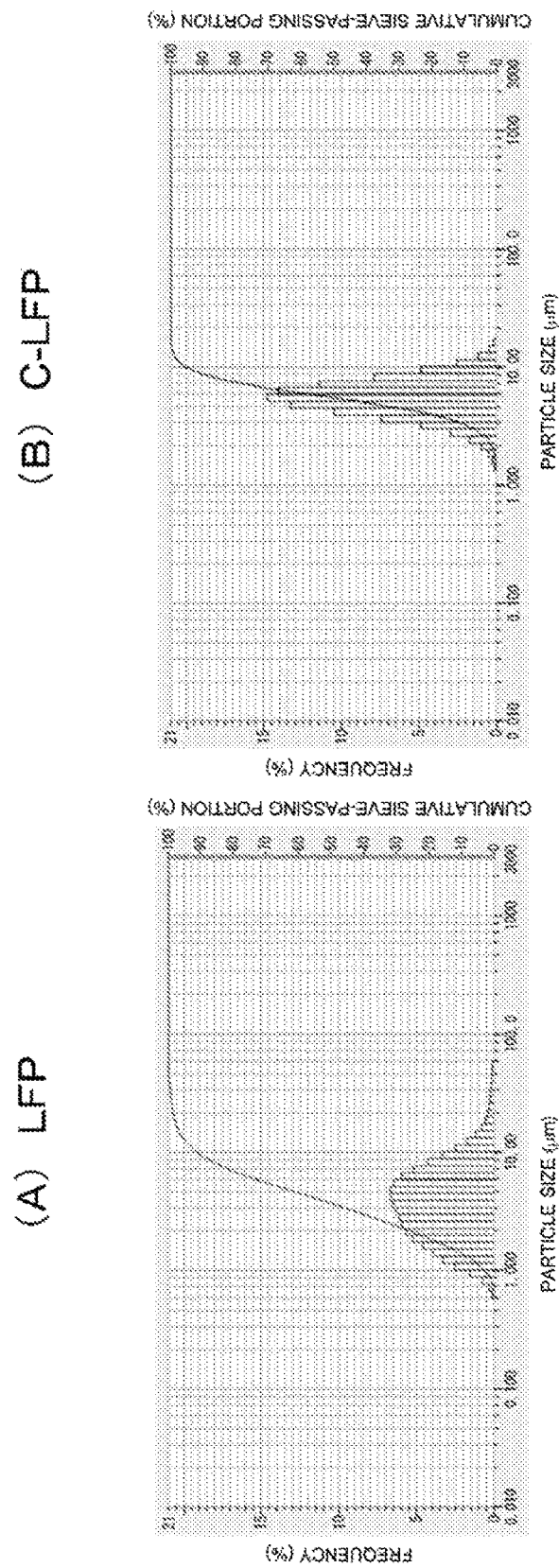

FIG. 17 is a diagram explaining the particle size distribution of the $LiFePO_4$ base material particles used for the positive electrode material, and FIG. 17(A) shows the case of the $LiFePO_4$ base material particles having no carbon support layer (hereinafter, may be described as "LFP") as Comparative Example 2, while FIG. 17(B) shows the case of the $LiFePO_4$ base material particles having a carbon support layer (hereinafter, may be described as "c-LFP") as Example 3. The particle size distribution of the LFP is similar to the bell-shaped distribution illustrated in FIG. 17(A), and the average particle size is 5.0 μm, while the maximum particle size is 60 μm. Coarse particles having a size that is about twelve times the average particle size are co-present. The particle size distribution of the c-LFP is similar to the bell-shaped distribution illustrated in FIG. 17(B), and the average particle size is 5.8 μm, while the maximum particle size is 17 μm. Aggregates or lumps are co-present.

Next, positive electrode sheets were produced using the LFP base material particles of Comparative Example 2 and the c-LFP base material particles of Example 3.

With regard to the LFP composition, LFP powder as a positive electrode material, acetylene black as a conductive material, and polyvinylidene fluoride (PVDF) as a binder were mixed in water, as a mixture composition, such that the mass ratio of those components would be 86:7:7, and thus a paste for forming a positive electrode active material layer was prepared. Upon the preparation of this paste, normal methylpyrrolidone (NMP) was used as a solvent, and the paste contained 50.7% of non-volatile components (NV).

With regard to the c-LFP composition, the c-LFP powder as a positive electrode active material, acetylene black as a conductive material, and polyvinylidene fluoride (PVDF) as a binder were mixed in water, as a mixture composition, such that the mass ratio of those components would be 86:7:7, and thus a paste for forming a positive electrode active material layer was prepared.

Each of the pastes of these compositions was applied on one surface of a positive electrode current collector (aluminum foil) and dried, and thereby a positive electrode active material layer was formed on one surface of the positive electrode current collector. For the application process, a thin film was produced using a doctor blade, and the gap was 350 µm. The amount of coating of the paste for forming a positive electrode active material layer was regulated such that the amount of coating after drying would be about 18 mg/cm$^2$ (on the basis of the solid content).

Regarding the negative electrode substrate, a graphite composition was selected. As a mixture composition for a negative electrode sheet, graphite powder as a negative electrode active material, carboxymethyl cellulose (CMC) as a thickening material, and a styrene-butadiene rubber (SBR) as a binder were mixed in water such that the mass ratio of those components would be 97.5:1.5:1, and thus a paste for forming a negative electrode active material layer was prepared. Upon the preparation of this paste, water ($H_2O$) was used as a solvent, and the paste contained 50.7% of non-volatile components (NV).

The paste of this composition was applied on one surface of a negative electrode current collector (copper foil) and dried, and thereby, a negative electrode active material layer was formed on one surface of the negative electrode current collector. For the application process, a thin film was produced using a doctor blade, and the gap was 180 µm. The amount of coating of the paste for forming a negative electrode active material layer was regulated such that the amount of coating after drying would be about 7 mg/cm$^2$ (on the basis of the solid content).

Test Example 2

Production of Lithium Ion Battery

Lithium secondary batteries (coin cells) were constructed using the positive electrode sheets of the LFP composition and the c-LFP composition obtained in Test Example 1. The production of the lithium secondary batteries was carried out as follows.

Figure 18:
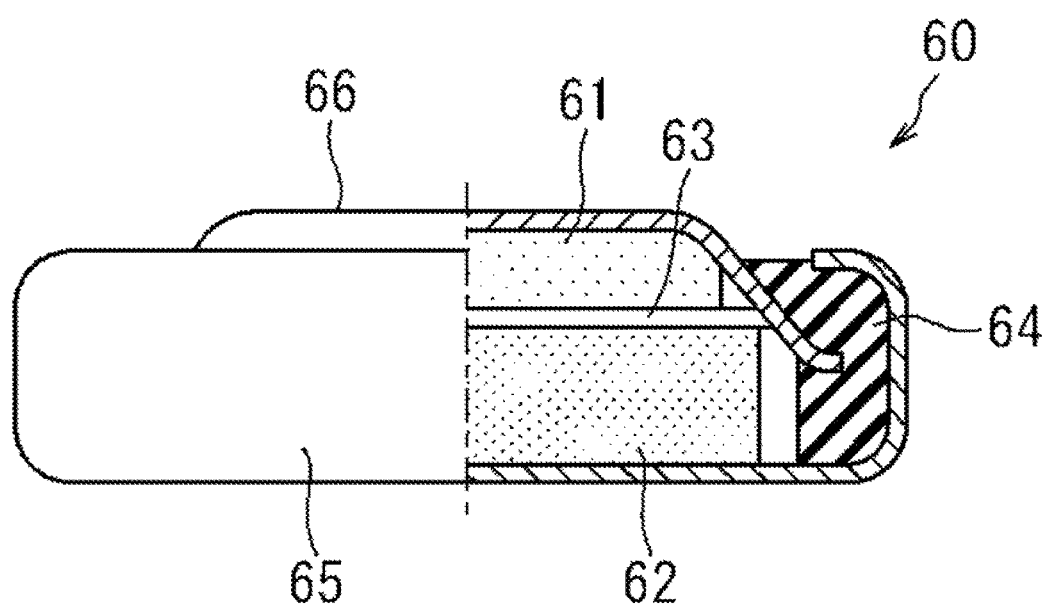
FIG. 18 is a cross-sectional diagram schematically illustrating a test lithium secondary battery (coin cell) related to a Test Example of the present invention.

FIG. 18 is a cross-sectional diagram schematically illustrating a test lithium secondary battery (coin cell) related to one Test Example of the present invention. In the diagram, a coin cell 60 is a coin cell intended for an evaluation of the charge-discharge performance, and is, for example, a container made of stainless steel, having a diameter of 20 mm and a thickness of 3.2 mm (2032 type). A positive electrode (working electrode) 61 is an electrode produced by punching the positive electrode sheet described above into a circular shape having a diameter of 16 mm. A negative electrode (opposite electrode) 62 is an electrode produced by punching the negative electrode sheet described above into a circular shape having a diameter of 16 mm. A separator 63 is a porous polypropylene sheet having a diameter of 22 mm and a thickness of 0.02 mm, and is impregnated with a liquid electrolyte. A gasket 64 maintains a container (negative electrode terminal) 65 and a lid (positive electrode terminal) 66 in an insulated state at predetermined positions. Meanwhile, in the coin cell 60, a non-aqueous liquid electrolyte is incorporated together with the positive electrode 61, the negative electrode 62, and the separator 63.

Here, regarding the non-aqueous liquid electrolyte, a product obtained by incorporating $LiPF_6$ as a supporting salt at a concentration of about 1 mol/liter into a mixed solvent including ethylene carbonate (EC) and diethyl carbonate (DEC) at a volume ratio of 3:7, was used. Thereafter, the coin cell was subjected to an initial charge-discharge treatment (conditioning) by a conventional method, and thus a test lithium secondary battery was obtained.

FIG. 19 is a diagram explaining the details of the trial manufacture specifications related to the coin cell illustrated in FIG. 18, and showing the mechanical design values of the positive electrode and the negative electrode. In regard to the positive electrode of the LFP composition, the thickness of the Al foil is 20 µm, the thickness of the electrode plate is 123 µm, the coating width is 16ϕ, the coating area is 2.0 cm$^2$, the mixture density is 1.8 g/cm$^3$, the mixture surface density is 18.3 mg/cm$^2$, the specific capacity at the initial charge is 160 (mAh/g), and the discharge specific capacity is 150 (mAh/g). In regard to the positive electrode of the c-LFP composition, the specifications are the same as those of the positive electrode of the LFP composition, except that the thickness of the electrode plate is 116 µm, the mixture density is 1.8 g/cm$^3$, the mixture surface density is 18.1 mg/cm$^2$.

In regard to the negative electrode of the LFP composition, the thickness of the Cu foil is 18 µm, the thickness of the electrode plate is 70 µm, the coating width is 16ϕ, the coating area is 2.0 cm$^2$, the mixture density is 1.5 g/cm$^3$, the mixture surface density is 7.6 mg/cm$^2$, the use capacity at the initial charge is 389 (mAh/g), and the discharge use capacity is 350 (mAh/g). In regard to the negative electrode of the c-LFP composition, the specifications are the same as those of the negative electrode of the LFP composition, except that the mixture surface density is 7.7 mg/cm$^2$.

FIG. 20 is a diagram explaining the details of a test product produced under the trial manufacture specifications related to the coin cell illustrated in FIG. 19. Two test products of LFP-01 and LFP-02 were produced as coin cells of the LFP composition. The positive electrode weight of LFP-01 was 47.85 mg, the negative electrode weight was 47.69 mg, the positive electrode basis weight was 18.401 mg/cm$^2$, the negative electrode basis weight is 7.627 mg/cm$^2$, the A/C ratio was 1.14, and the design capacity was 4.77 mAh. The specifications of LFP-02 are also the same as those of LFP-01. Furthermore, also for CLFP-01 and CLFP-02, the values illustrated in FIG. 20 are obtained. The third values described in bold letters are respectively an average value of LFP-01 and LFP-02 and an average value of CLFP-01 and CLFP-02.

Test Example 3

Test for Charge-Discharge Characteristics of Lithium Ion Battery

Each of the test lithium secondary batteries obtained as described above was subjected to a charge-discharge test. In a discharge capacity test, the battery was charged at a constant current (2.25 mA) under the temperature conditions of room temperature, 21° C., until the voltage between terminals reached 4.0 V, and then was charged for 1.5 hours at a constant voltage of 4.0 V. The battery obtained after such CC-CV charging was discharged at a constant current (0.90 mA) under the temperature conditions of room temperature, 21° C., until the voltage between terminals reached 2.0 V, and the battery capacity at that time was measured.

Figure 22:
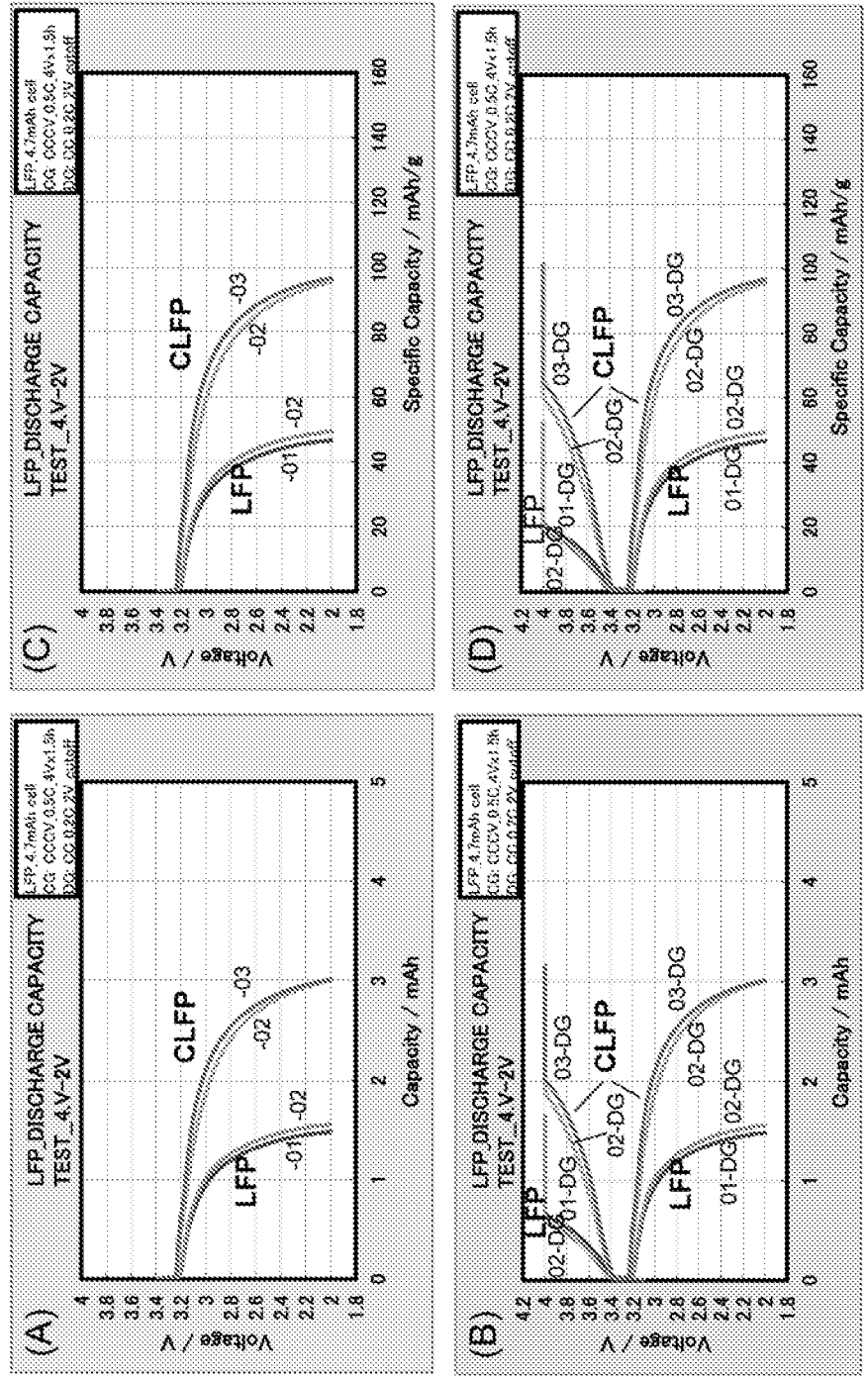
FIG. 22 is a graph showing a charge-discharge curve explaining the discharge capacity characteristics of the test product related to a Test Example of the present invention.

The results are presented in FIG. 21 and FIG. 22. FIG. 21 is a diagram explaining the discharge capacity characteristics of the test product related to one Test Example of the present invention. In the coin cell of the LFP composition, the specific capacity is about 48 mAh/g, and the ratio with respect to the design value is only about 32%. On the contrary, in the coin cell of the c-LFP composition, the specific capacity is about 96 mAh/g, and the ratio with respect to the design value is increased to about 64%.

FIG. 22 is a graph showing a charge-discharge curve explaining the discharge capacity characteristics of a test product related to one Test Example of the present invention. In the coin cell of the c-LFP composition, since $LiFePO_4$ base material particles having a carbon support layer are used, the discharge capacity is increased to about twice compared to the coin cell of the LFP composition.

From these results, it was confirmed that when a $LiFePO_4$ positive electrode sheet having a carbon support layer on the surface of the positive electrode active material layer is used, a lithium secondary battery having excellent charge-discharge characteristics can be constructed.

Here, examples of base material powders for a lithium ion battery positive electrode material produced by the method for manufacturing a base material powder having a carbon nanocoating layer are shown in Table 3.

TABLE 3

|  | Substrate (base material) | Coating |
|---|---|---|
| Positive electrode material for Li ion secondary battery | $LiVOP_4$ | C |
|  | $LiFePO_4$ | C |
|  | $Li_2S$ | C |
|  | $LiNi_{0.5}Mn_{1.5}PO_4$ | C |

Particular embodiments of the present invention have been illustrated and explained; however, it is clearly to those skilled in the art that various other variations and modifications can be made without deviating from the spirit and the scope of the present invention. Therefore, all those variations and modifications within the scope of the present invention are intended to be handled in the appended claims.

For example, in regard to the method for manufacturing a superconductor, the aromatic hydrocarbon to be used may be, in addition to coronene, any aromatic hydrocarbon that is vaporized by heating and undergoes polymerization/condensation. Furthermore, in regard to the amount of addition of the aromatic hydrocarbon, since the amount of carbon adhering to the surface of boron powder varies with the amount of addition, the amount of addition can be changed as necessary. Furthermore, in regard to the heat treatment temperature, coronene undergoes polymerization and condensation at or above 600° C., and in order to obtain almost only carbon, it is necessary to perform a heat treatment at or above 600° C. In regard to other aromatic hydrocarbons, since each of the aromatic hydrocarbons has an intrinsic temperature at which polymerization or condensation proceeds, it is necessary to perform a heat treatment at or above the temperature.

Furthermore, regarding the aromatic hydrocarbon used according to the embodiments of the method for manufacturing a positive electrode material for a lithium ion battery of the present invention, coronene is taken as an example; however, the present invention is not intended to be limited to this, and any aromatic hydrocarbon which is vaporized by heating and undergoes polymerization/condensation may be used, in addition to coronene. Furthermore, in regard to the amount of addition of the aromatic hydrocarbon, since the amount of carbon adhering to the surface of $LiFePO_4$ powder varies with the amount of addition, the amount of addition can be changed as necessary. Furthermore, in regard to the heat treatment temperature, coronene undergoes polymerization and condensation at or above 600° C., and in order to obtain almost only carbon, it is necessary to perform a heat treatment at or above 600° C. However, in regard to other aromatic hydrocarbons, since each of the aromatic hydrocarbons has an intrinsic temperature at which polymerization or condensation proceeds, it is necessary to perform a heat treatment at or above the temperature.

Furthermore, in regard to the lithium ion battery of the present invention, a coin cell type Example has been described; however, the lithium ion battery may have a shape other than a coin cell type that is generally used by those skilled in the art, or may be of a wound electrode body type or a laminated electrode body type.

INDUSTRIAL APPLICABILITY

According to the method for manufacturing a base material powder having a carbon nanocoating layer of the present invention, it is possible to conveniently provide a carbon coating layer having a thickness at a nanometer level on various substrates (base materials) only by heat-treating a base material and a polycyclic aromatic hydrocarbon together in a vacuum, and the production method can be applied to $MgB_2$ superconductor, lithium ion batteries, photocatalysts, tribology, and the like.

According to the method for manufacturing $MgB_2$ superconductor of the present invention, addition of a polycyclic aromatic hydrocarbon (nanographene) to a $MgB_2$ superconducting wire with excellent uniformity can be realized, and a $MgB_2$ superconducting wire having high critical current density (Jc) characteristics and a critical current density (Jc) with less fluctuation can be provided. The $MgB_2$ superconductor thus produced is suitable for the use in superconducting linear motor cars, MRI medical diagnostic apparatuses, semiconductor single crystal pulling apparatuses, superconducting energy storages, superconducting rotating machines, superconducting transformers, superconducting cables, and the like.

According to the method for manufacturing a positive electrode material for a lithium ion battery of the present invention, it is possible to conveniently provide a carbon coating layer having a thickness at a nanometer level on various substrates (base materials), only by heat-treating a base material and a polycyclic aromatic hydrocarbon together in a vacuum, and this method can be applied to lithium ion batteries, and the like.

Furthermore, according to the lithium ion battery of the present invention, by using a lithium-containing positive electrode sheet such as a $LiFePO_4$ positive electrode sheet having a carbon support layer on the surface of a powder of a positive electrode active material, a lithium secondary battery having excellent charge-discharge characteristics can be constructed.

REFERENCE SIGNS LIST

FIGS. 2, 3, and 18
10 CONTAINER

20 VACUUM STATE RETAINING MEANS
30 HEATING APPARATUS
40 HEAT TREATMENT CONTROLLING APPARATUS
50 CONVEYANCE APPARATUS
60 COIN CELL
61 POSITIVE ELECTRODE (WORKING ELECTRODE)
62 NEGATIVE ELECTRODE (OPPOSITE ELECTRODE)
63 SEPARATOR
64 GASKET
65 CONTAINER (NEGATIVE ELECTRODE TERMINAL)
66 LID (POSITIVE ELECTRODE TERMINAL)
70 B+CORONENE MIXED POWDER
80 GLASS TUBE
90 HEAT-TREATMENT FURNACE

The invention claimed is:

1. A method for manufacturing a positive electrode material for a lithium ion battery, the positive electrode material having a metal oxide or a metal sulfide constituting a positive electrode material for a secondary battery using a non-aqueous electrolyte, and a carbon film coating the surface of the metal oxide or the metal sulfide, and the metal oxide or the metal sulfide being formed from a base material powder for lithium ion battery positive electrode material selected from the group consisting of $SnO_2$, $LiVPO_4$, $LiFePO_4$, $LiNi_{0.5}Mn_{1.5}O_4$, $LiMnPO_4$, $Li_2FeSiO_4$, $V_2O_5$, $MnO_2$, $LiCoO_2$, $LiNiO_2$, $LiNi_{0.5}Mn_{0.5}O_2$, $LiMn_2O_4$, $Li_2S$ and $SiO_2$, the method comprising adding a polycyclic aromatic hydrocarbon to the base material powder, heating the mixture consisting of the polycyclic aromatic hydrocarbon and the base material powder to a temperature that is higher than or equal to the boiling point of the polycyclic aromatic hydrocarbon and is lower than or equal to the boiling point temperature of the polycyclic aromatic hydrocarbon+300° C., and that is higher than or equal to the thermal decomposition temperature of the polycyclic aromatic hydrocarbon, and thereby coating the surface of the base material powder with from 1 layer to 300 layers of carbon atoms.

2. A method for manufacturing a positive electrode material for a lithium ion battery, the positive electrode material having a metal oxide or a metal sulfide constituting a positive electrode material for a secondary battery using a non-aqueous electrolyte, and a carbon film covering the surface of the metal oxide or the metal sulfide, and the metal oxide or the metal sulfide being formed from a base material powder for a lithium ion battery positive electrode material selected from the group consisting of $SnO_2$, $LiVPO_4$, $LiFePO_4$, $LiNi_{0.5}Mn_{1.5}O_4$, $LiMnPO_4$, $Li_2FeSiO_4$, $V_2O_5$, $MnO_2$, $LiCoO_2$, $LiNiO_2$, $LiNi_{0.5}Mn_{0.5}O_2$, $LiMn_2O_4$, $Li_2S$ and $SiO_2$, the method comprising adding a polycyclic aromatic hydrocarbon to the base material powder, heating the mixture consisting of the polycyclic aromatic hydrocarbon and the base material powder to a temperature that is higher than or equal to the boiling point of the polycyclic aromatic hydrocarbon and is lower than or equal to the boiling point temperature of the polycyclic aromatic hydrocarbon+300° C., and that is higher than or equal to the thermal decomposition temperature of the polycyclic aromatic hydrocarbon, and thereby coating the surface of the base material powder with a layer of carbon having a thickness of from 0.1 nm to 20 nm.

3. A method for manufacturing a photocatalyst, the photocatalyst using silver particles and $TiO_2$ particles and employing the $TiO_2$ particles as a base material powder, with the surface of the base material powder being coated with a carbon film, the method comprising adding a polycyclic aromatic hydrocarbon to the base material powder, heating the mixture consisting of the polycyclic aromatic hydrocarbon and the base material powder to a temperature that is higher than or equal to the boiling point of the polycyclic aromatic hydrocarbon and is lower than or equal to the boiling point temperature of the polycyclic aromatic hydrocarbon+300° C., and that is higher than or equal to the thermal decomposition temperature of the polycyclic aromatic hydrocarbon, and thereby coating the surface of the base material powder with from 1 layer to 300 layers of carbon atoms.

4. A method for manufacturing a photocatalyst, the photocatalyst using silver particles and $TiO_2$ particles and employing the $TiO_2$ particles as a base material powder, with the surface of the base material powder being coated with a carbon film, the method comprising adding a polycyclic aromatic hydrocarbon to the base material powder, heating the mixture consisting of the polycyclic aromatic hydrocarbon and the base material powder to a temperature that is higher than or equal to the boiling point of the polycyclic aromatic hydrocarbon and is lower than or equal to the boiling point temperature of the polycyclic aromatic hydrocarbon+300° C., and that is higher than or equal to the thermal decomposition temperature of the polycyclic aromatic hydrocarbon, and thereby coating the surface of the base material layer of carbon having a thickness of from 0.1 nm to 10 nm.

* * * * *